US008406170B2

(12) United States Patent
Rune

(10) Patent No.: US 8,406,170 B2
(45) Date of Patent: Mar. 26, 2013

(54) GATEWAY SELECTION MECHANISM

(75) Inventor: Johan Rune, Lidingö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 613 days.

(21) Appl. No.: 12/514,325

(22) PCT Filed: Nov. 16, 2006

(86) PCT No.: PCT/SE2006/050483
§ 371 (c)(1),
(2), (4) Date: May 11, 2009

(87) PCT Pub. No.: WO2008/060208
PCT Pub. Date: May 22, 2008

(65) Prior Publication Data
US 2010/0054222 A1    Mar. 4, 2010

(51) Int. Cl.
*H04W 4/00* (2009.01)
(52) U.S. Cl. ........................ 370/328
(58) Field of Classification Search ............... 370/338, 370/310, 310.2, 313, 328, 331, 312, 389, 370/252, 254; 455/432.1, 434, 436
See application file for complete search history.

(56) References Cited

U.S. PATENT DOCUMENTS

| | | | |
|---|---|---|---|
| 6,469,998 B1* | 10/2002 | Burgaleta Salinas et al. | 370/338 |
| 6,961,563 B2* | 11/2005 | Holler et al. | 455/432.1 |
| 7,143,187 B1* | 11/2006 | Takeda et al. | 709/245 |
| 7,508,753 B2* | 3/2009 | Greenspan et al. | 370/218 |
| 2005/0174984 A1* | 8/2005 | O'Neill | 370/349 |
| 2006/0109826 A1 | 5/2006 | Zhang | |
| 2007/0036120 A1* | 2/2007 | Zhang et al. | 370/338 |
| 2007/0060097 A1* | 3/2007 | Edge et al. | 455/404.1 |
| 2010/0054222 A1* | 3/2010 | Rune | 370/338 |

OTHER PUBLICATIONS

3GPP. $3^{rd}$ Generation Partnership Project; Technical Specification Group Services and System Aspects; 3GPP System to Wireless Local Area Network (WLAN) Interworking; System Description (Release 7). 3GPP TS 23.234 v7.3.0. Sep. 2006.

* cited by examiner

Primary Examiner — Kwang B Yao
Assistant Examiner — Anh Ngoc Nguyen

(57) ABSTRACT

An arrangement and method in a Public Land Mobile Network (PLMN) for selecting a gateway to connect a User Equipment (UE) to a home PLMN when the UE is located in an access network connected to a visited PLMN. The arrangement receives a first Fully Qualified Domain Name (FQDN), which includes an identity of the UE user. Based on the identity of the user and knowledge of the visited PLMN, the arrangement selects whether the UE should establish a connection only to a gateway in the home PLMN, only to a gateway in the visited PLMN, or both. The arrangement transmits to the UE, an appropriate address for the home PLMN gateway, the visited PLMN gateway, or both depending on the selection.

18 Claims, 11 Drawing Sheets

GATEWAY SELECTION MECHANISM

TECHNICAL FIELD

The present invention relates to a mobile communication network and in particular, to a gateway selection mechanism e.g. for Interworking-Wireless Local Area Network (I-WLAN) and evolutions of the Universal Mobile Telecommunications System (UMTS).

BACKGROUND

The invention relates to the interworking of Third Generation Partnership Project (3GPP) Public Land Mobile Networks (PLMNs) i.e. General Packet Radio Service/Universal Mobile Telephony System (GPRS/UMTS) and Wireless Local Area Network (WLAN) access networks, commonly known as I-WLAN. It also relates to the planned/anticipated evolution of the current 3GPP network (i.e. GPRS/UMTS) architecture into a somewhat simplified and more multi-access oriented form, as being worked out by the 3GPP. This evolution and its related activities in the 3GPP are commonly referred to as System Architecture Evolution (SAE).

I-WLAN is being specified by the 3GPP and the functional description is provided in 3GPP TS 23.234 v6.4.0, $3^{rd}$ Generation Partnership Project; Technical Specification Group Services and System Aspects; 3GPP system to Wireless Local Area Network (WLAN) interworking; System description (Release 6).

One of the I-WLAN scenarios specified by the 3GPP is the WLAN 3GPP IP Access. FIG. 1a shows a reference model of the roaming variant of the WLAN 3GPP IP Access, where a WLAN Access Network 100 is connected to a 3GPP Visited Network 110. A WLAN User Equipment (UE) 120, i.e. the I-WLAN terminal also referred to as a user terminal, is located in an area controlled by the WLAN access network 100 connected to the visited network 110. The UE 120, which can also be called user terminal or just terminal, has a further connection to the home network 130, i.e. to a gateway 140, referred to as the Packet Data Gateway (PDG), via the Wu interface 150. Although this connection physically goes via the WLAN access network 100 and the visited network 110, it is depicted in FIG. 1a as a direct line between the UE 120 and the PDG 140, because the line represents the logical interface between the UE 120 and the PDG 140. The WLAN access network 100 has connections to the gateway 160 of the visited network 110, referred to as WLAN Access gateway (WAG) via the Wn interface 170 and to an Authentication, Authorization and Accounting (AAA) proxy 180 via the Wa interface 210. The WAG 160 is also connected to the AAA proxy 180 via the Wg interface 200. The gateways of the home and the visited networks are connected via the Wp interface 190. Moreover, the AAA proxies of the home and the visited network are connected via the Wd interface 220. The entities of FIG. 1a not described are not relevant for the invention and are only included to give a more complete picture of the network architecture.

In the context of this invention only a scenario denoted WLAN 3GPP IP Access scenario is of interest and therefore the WLAN 3GPP IP Access scenario is assumed in all further descriptions, unless explicitly stated otherwise.

In the WLAN 3GPP IP Access scenario the traffic between an I-WLAN terminal accessing a WLAN access network and a peer on the Internet is tunneled between the terminal and the home PLMN, via the WLAN access network and the visited PLMN, and routed between the tunnel endpoint in the home PLMN and the peer on the Internet. This is referred to as home tunneling. As an option the traffic may instead be tunneled between the I-WLAN terminal and the visited PLMN, without involving the home PLMN in the traffic processing, which is referred to as local breakout.

The tunnel traverses the Wn and Wp interfaces. When traversing the Wn interface the tunnel may traverse untrusted networks with unknown capabilities, e.g. the Internet. On the Wp interface the traversed networks are regarded as secure, either operator internal networks or the inter-operator network GPRS roaming exchange (GRX).

The tunnel endpoint in the home or visited PLMN is a gateway, either the PDG or the Tunnel Terminating Gateway (TTG) These two nodes should be regarded as alternative implementations where in the TTG case the PDG functionality is split between the TTG and the GGSN, but theoretically it would be possible to have both types of implementations in the same network.

When an I-WLAN terminal attempts to access a WLAN access network, the WLAN access network has the option to authenticate the user before granting the access. If the WLAN access network chooses to use this option (which will probably be more common than the opposite), it uses the Authentication, Authorization and Accounting (AAA) infrastructure to authenticate the identity of the user, aided by the AAA server in the user's home PLMN. The authentication mechanism is either EAP-AKA as described in J. Arkko, H. Haverinen, "" Extensible Authentication Protocol Method for $3^{rd}$ Generation Authentication and Key Agreement (EAP-AKA), RFC 4187, January 2006 or EAP-SIM as described in H. Haverinen, J. Salowey, "Extensible Authentication Protocol Method for Global System for Mobile Communications (GSM) Subscriber Identity Modules (EAP-SIM)", RFC 4186, January 2006, which is communicated transparently between the terminal and the home AAA server, via the AAA proxy in the visited PLMN in the roaming case.

When the user is permitted access to the WLAN access network (whether authenticated or not), the terminal uses Internet Key Exchange version 2 (IKEv2), further described in Charlie Kaufman et al., "Internet Key Exchange (IKEv2) Protocol", RFC 4306, December 2005, to establish an IPsec tunnel, further described in S. Kent, Rt. Atkinson, "Security Architecture for the Internet Protocol", RFC 2401, November 1998, and S. Kent, K. Seo, RFC 4301, with the same title, to the PDG/TTG in the home PLMN via the WAG in the selected visited PLMN. Optionally, the IPsec tunnel may be established between the terminal and the PDG/TTG in the visited PLMN instead of the PDG/TTG in the home PLMN. The terminal uses the WLAN Access Point Name (W-APN), which is stored in the Subscriber Identity Module (SIM) or the Universal Subscriber Identity Module (USIM) (on the Universal Integrated Circuit Card (UICC)), to determine the IP address of the PDG/TTG to be used as the remote tunnel endpoint. The W-APN, which constitutes a domain name consisting of a Network Identifier and an Operator Identifier (in that order), is resolved into an IP address through regular Domain Name System (DNS) mechanisms.

In IKEv2 EAP-AKA or EAP-SIM is used as an integrated mechanism to authenticate the user to the PDG/TTG during the tunnel establishment. The PDG/TTG communicates with the AAA server in the home network via a AAA protocol, preferably Diameter e.g. described in Pat Calhoun et al., "Diameter Base Protocol", RFC 3588, September 2003, and P. Eronen et al., "Diameter Extensible Authentication Protocol (EAP) Application", RFC 4072, August 2005, to have the user authenticated.

When the IPsec tunnel is established, the PDG/TTG assigns an "inner" IP address to the terminal.

If the tunnel endpoint in the PLMN is a TTG, then the TTG also establishes a GTP tunnel to the GGSN and associates the IPsec tunnel and the GTP tunnel with each other. Then the regular traffic through the tunnel(s) can commence.

The basic tasks of the WLAN Access Gateway (WAG) in addition to routing packets between the WLAN access network and the PDG/TTG include:

Count packets and generate accounting data when the PDG/TTG is located in another network.

Simple packet filtering based on unencrypted information in the IP header. The packet filters are derived from policy enforcement information transferred to the WAG 160 (over the Wg interface) from the home AAA servers 230 of the concerned subscribers (via the Wd 220 interface and the AAA proxy 180 in case the WAG is located in the visited PLMN).

Selection of PDG/TTG is provided via DNS based on a Fully Qualified Domain Name (FQDN) derived from the W-APN and the PLMN ID (i.e. the HPLMN ID or the VPLMN ID). When a TTG is used, the Network Service Access Point Identifier (NSAPI) allocation requires that for a given user, all tunnels towards W-APNs served from the same GGSNs should be directed to the same TTG.

One long-term target architecture that has been considered in the architecture evolution work includes an overall multi-access core network with AENs (Access Edge Nodes) at the edges according to FIG. 1b. An AEN is thought of as an evolution of an advanced version of a GPRS Support Node labeled "GSN+". A GSN+ 430 is in turn an evolved version of the GPRS Support Node (GSN) in the current 3GPP network architecture. FIG. 1b illustrates a Home network 300 comprising an AEN 310 and policy and charging control functions 320 and a visited network 400 also comprising an AEN 410 and policy and charging control functions 420. A roaming interface 440 is provided between the home and the visited network. The AEN of the visited network is further connected to different access networks such as Wideband Code Division Multiple Access (WCDMA), Global System for Mobile communications/Enhanced Data rates for GSM Evolution (GSM/EDGE), Public WLAN and various variants of Digital Subscriber Line (xDSL, where x can represent various letters, such as A for "Asymmetric", S for "Symmetric", H for "High speed" or V for "Very high speed") access networks. The AENs comprise common access independent (but to a certain extent "access aware") functionality that is used for all accesses. In addition there is an access dependent part for each specific access technology served by an AEN. An AEN may be realized as multiple cooperating nodes.

Regarding I-WLAN the evolution strategy is to simplify the architecture and to incorporate the nodes/functions more closely into the general 3GPP architecture than in the current specifications. In the long-term target architecture it is proposed that the PDG/TG and the WAG be merged into the AEN. Possible intermediate stages may include that the PDG/TTG is merged into future evolved GPRS support nodes (GSN+), that the PDG/TTG and the WAG are merged into future evolved GPRS support nodes (GSN+) or even that the PDG/TTG and the WAG are merged. The view of the evolved future network architecture is not stable yet and hence the result of this work in the 3GPP may well be something that is different from what is illustrated in FIG. 1b. Another proposed evolved network architecture is illustrated in FIG. 1c. The AEN in the evolved network architecture as depicted in FIG. 1b is more or less equal to a combination of nodes referred to as the Inter Access System Anchor (IASA), the Mobility Management Entity (MME) and the User Plane Entity (UPE) in the evolved network architecture illustrated in FIG. 1c. FIG. 1c illustrates the scenario when both home routed traffic and local breakout traffic are routed via the visited Inter AS Anchor (v-IASA) in the roaming case. It should be noted that the AAA server is assumed to be integrated in the Home Subscriber Server (SS). The visited network comprises a GPRS core network 530 and an Evolved Packet Core (EPC) 500 comprising the IASA 520 and the MME 510 and the UPE 510. The visited GPRS core network 530 is connected to a plurality of different access networks such as GSM EDGE radio access network (GERAN), UMTS Terrestrial Radio Access Network (UTRAN) and evolved Radio Access Network (evolved RAN) while the IASA 520 of the visited EPC 500 is connected to a WLAN which is of interest for the present invention. The visited IASA 520 is connected to a policy control resource function 540 of the visited network, to the HSS 620 of the home network and to the IASA 610 of the home EPC 600.

In SAE, which extends the system to multi-access (through heterogeneous accesses), two "tiers" of mobility management are assumed: one tier for the inter access mobility (i.e. mobility between access networks of different types) and one tier for the "internal" mobility in the 3GPP domain. Both tiers utilize anchor nodes as a stable point for the traffic. The Inter Access System Anchor (IASA) is the anchor node for the inter-access mobility and the User Plane Entity (UPE) is the anchor node for the intra-3GPP domain mobility. The UPE is a pure user plane node and it is complemented by the Mobility Management Entity (MME) which handles the control plane for the intra-3GPP domain mobility management (as well as other access related signaling).

In FIG. 1c, the roaming with home tunneling case involves two IASA nodes, one visited IASA (v-IASA) in the visited PLMN and one home IASA (h-IASA) in the home PLMN. In this description the IASA that is closest to the terminal/UE is denoted "serving IASA" (s-IASA). In the non-roaming case the s-IASA is the h-IASA and in the roaming with local breakout case the s-IASA is the v-IASA. In the architecture illustrated in FIG. 1c the s-IASA is the v-IASA in all roaming cases, both for local breakout and for home tunneling/home routing.

The SAE architecture includes an anchor node for inter-access system mobility. This anchor node is assumed to be a Mobile IP (MIP) Home Agent (HA). Preferably it is a Mobile IPv6 (MIPv6) HA, but it may also turn out to be a Mobile IPv4 (MIPv4) HA. The HA will probably be integrated in, or co-located with, the h-IASA. Whether the h-IASA corresponds to a single HA or multiple (e.g. for redundancy or load sharing purposes) is not decided and may not have to be specified at all.

Local breakout in I-WLAN, i.e. the scenario when the UE-PDG/TTG tunnel is established between the UE and PDG/TTG in the visited PLMN (henceforth denoted PDGv/TTGv), is possible also in the current I-WLAN solution, to a certain extent under the control of the home operator.

To select local breakout the user/UE constructs an FQDN using the W-APN Network Identifier and the VPLMN ID as the Operator Identifier and performs a DNS query to resolve the FQDN into one or several PDGv/TTGv IP addresses) (i.e. using information originating in a DNS server in the VPLMN). It should be noted that the terms "DNS server", "DNS name server" and "name server" are regarded as synonyms in this description. Then the IPsec tunnel is established between the UE and the PDGv/TTGv using IKEv2 and with the home AAA server authenticating and authorizing the user/UE.

To select home tunneling (the basic case i.e. non-local breakout) the user/UE constructs an FQDN indicating the HPLMN.

When local breakout is used, the HPLMN authorizes the local breakout through the AAA communication between the PDGv/TTGv and the home AAA server. If the policy of the HPLMN does not allow local breakout (for this user, W-APN, VPLMN or any combination of these), then the home AAA server sends a rejection message to the PDGv/TTGv, which in turn rejects the tunnel establishment. The user/UE may then start the W-APN resolution and tunnel establishment procedure all over again using an FQDN indicating the HPLMN.

If the user/UE has selected home tunneling, but the policy of the HPLMN mandates/prefers local breakout, then the home AAA server can either reject the tunnel establishment or accept it in spite of the policy. If the tunnel establishment is rejected, the UE will not retry tunnel establishment towards the VPLMN according to 3GPP TS 23.234 v6.4.0, $3^{rd}$ Generation Partnership Project; Technical Specification Group Services and System Aspects; 3GPP system to Wireless Local Area Network (WLAN) interworking; System description (Release 6)"".

The home AAA server may provide the PDG and the WAG with packet filter instructions. When a TTG is used the intention is to reuse the packet filtering functionality of the GGSN, but nothing prevents that the home AAA server still provides the TTG with packet filter instructions. When the PDG/TTG and/or WAG is located in the VPLMN, the home AAA server provides the packet filter instructions via the AAA proxy in the VPLMN.

As mentioned above, in the TTG case it is required that for a given user, all tunnels towards W-APNs served from the same GGSNs should be directed to the same TTG. Currently there is no existing solution for this. The TTG address is selected and returned via DNS solely based on the FQDN that is derived from a W-APN and a PLMN ID. There is no user information available to aid the TTG IP address selection.

The allocation of the serving IASA (or AEN) when a non-3GPP access (or an evolved I-WLAN access) is used is to a large extent still an open issue. The s-IASA is supposed to be selected/allocated by an access node in the access network, generally denoted Access Gateway (AGW), based on the user ID and policies. This is a very high-level assumption without any technical details provided.

Allocation of a Mobile IPv6 Home Agent is assumed to be performed via DNS, according to the principles put forth by the IETF Mobility for IPv6 working group in J. Giaretta "Mobile IPv6 bootstrapping in split scenario", internet-Draft: draft-ietf-mip6-bootstrapping-split-02, March 2006.

The UE uses the regular DNS mechanisms to resolve an FQDN associated with its Home Agent and the DNS system returns an IP address of an allocated Home Agent. There are two ways to go about, denoted the "HA DNS lookup by name" method and the "HA DNS lookup by service" method respectively.

If the UE is configured with an FQDN of a Home Agent, it sends a DNS query with the QNAME set to the HA FQDN, e.g. "ha.home-operator.com", and the QTYPE set to "AAAA". In response the DNS server returns an IP address belonging to the Home Agent. This is the "HA DNS lookup by name" method.

The UE does however not have to be configured with an FQDN of a Home Agent. It is enough that it is configured with an FQDN representing its home operator, e.g. "home-operator.com". In such case the UE sends a DNS query with the QNAME set to "$\_{mip}6.\_ipv6$.home-operator.com" and the QTYPE set to "SRV" (indicating a request for a service resource record). In response the DNS server returns a list of one or more FQDNs belonging to the available Home Agents, of which the UE selects one. The DNS server may also include the IP addresses of the Home Agents in addition to the FQDNs. Otherwise the UE has to request the DNS system to resolve the FQDN of the selected HA into an IP address as described for the "HA DNS lookup by name" method. This is the "HA DNS lookup by service" method.

The same methods may be used for allocation of a Mobile IPv4 Home Agent, when a co-located care-of address is used (i.e. when no Foreign Agent is used). When a Foreign Agent is used, the Foreign Agent could use the above methods to have a Home Agent allocated on behalf of the UE.

In the context of HPLMN controlled local breakout, the initial choice of whether to use local breakout or home tunneling lies entirely with the user/UE. The HPLMN can only accept or reject this choice through the AAA protocol.

A rejection of local breakout can also be seen as an implicit redirection of the local breakout tunnel to a home tunnel, since the rejection will cause the UE to attempt a new tunnel establishment by using a new FQDN towards the home network.

A rejection of home tunneling will not cause an implicit redirection to a local breakout tunnel. Thus, rejection of home tunneling in practice means that network access is rejected (except for possible WLAN Direct IP Access traffic).

Hence, the HPLMN can only affect the initial choice of the user/UE in one direction, i.e. from local breakout to home tunneling, not the other way around. In addition, the implicit means that the HPLMN has to redirect the UE from local breakout to home tunneling, i.e. rejection triggering a new tunnel establishment attempt to the home network, is inefficient and slow, significantly increasing the access delay. IPsec tunnel establishment using IKEv2 is not a very swift procedure. Therefore, rejecting one tunnel establishment procedure to initiate a new one (with preceding DNS procedure) introduces a delay that the user may perceive as inconvenient. Moreover, the redundant double tunnel establishment procedure unnecessarily consumes resources in the involved networks.

A problem with the s-IASA selection mechanism is that there are no details provided beyond the statement that the AGW selects the s-IASA based on user-ID and policy.

A problem with the currently proposed solution for HA allocation in SAE is that it provides the HPLMN with very poor means for flexible selection of the HA. It basically enables no other flexibility than a plain load-sharing scheme. It completely lacks means for HA selection/allocation based on relevant information, such as policies, user specific conditions, VPLMN, etc.

SUMMARY

Thus, it would be desirable to achieve a solution where the HPLMN is allowed to make the decision whether local breakout should be selected, since the HPLMN is aware of policies and other properties that are relevant when making the decision.

Thus an object with the present invention is to achieve an improved solution for determining whether local breakout or home tunneling should be used when a mobile terminal is to be connected to a WLAN access network of a visited network.

That is achieved according to a first aspect by an arrangement in a PLMN for selecting a gateway to which to connect a UE, located in an access network connected to a visited PLMN of the UE. The PLMN is a home PLMN of the user of the UE. The arrangement comprises means for receiving a first Fully Qualified Domain Name, FQDN, wherein the first FQDN comprises an identity of the user of the UE, and the home PLMN is aware of an identity of the visited PLMN. The arrangement comprises means for selecting, at least based on the received identity of the user, whether the UE should establish connection only to a gateway, e.g. a PDG/TTG, in the home PLMN, only to a gateway in the visited PLMN or to both a gateway in the home PLMN and a gateway in the visited PLMN and means for transmitting an address belonging to a gateway in the visited PLMN if connection only to a gateway in the visited PLMN is selected or an address belonging to a gateway in the home PLMN if connection only to a gateway in the home PLMN is selected or addresses belonging to both a gateway in the home PLMN and a gateway in the visited PLMN if connection to both is selected.

According to a second aspect, the UE comprises means for including an identity of the UE into the first FQDN, and means for receiving an address to a gateway in the visited PLMN if the home PLMN has selected that the UE should connect to a gateway in the visited PLMN or/and an address to a gateway in the home PLMN if the home PLMN has selected that the UE should connect to a gateway in the home PLMN at least based on the identity of the UE.

According to a third aspect, a method in a PLMN for selecting a gateway to which to connect a UE located in an access network connected to a visited PLMN of the UE, wherein the PLMN is a home PLMN of the UE is provided. The PLMN receives a first FQDN comprising an identity of the UE and the home PLMN is aware of an identity of the visited PLMN.

At least based on the received identity of the user the PLMN selects whether the UE should establish connection only to a gateway in the home PLMN, only to a gateway in the visited PLMN or to both a gateway in the home PLMN and a gateway in the visited PLMN. Therefore, the PLMN transmits an address belonging to a gateway in the visited PLMN, if connection only to a gateway in the visited PLMN is selected, or an address belonging to a gateway in the home PLMN, if connection only to a gateway in the home PLMN is selected, or addresses belonging to both a gateway in the home PLMN and a gateway in the visited PLMN if connection to both is selected.

According to a fourth aspect, a method in a UE is provided comprising the steps of including an identity of the UE into the first FQDN, and receiving an address to a gateway in the visited PLMN if the home PLMN has selected that the UE should connect to a gateway in the visited PLMN or/and an address to a gateway in the home PLMN if the home PLMN has selected that the UE should connect to a gateway in the home PLMN at least based on the identity of the UE.

According to a preferred embodiment, the means for selecting further comprises means for identifying, based on the user identity, one or more valid policies which govern the outcome of the selecting.

According to a fifth aspect an arrangement in a PLMN for selecting a gateway to which to connect a UE located in an access network connected to a visited PLMN of a UE, wherein the PLMN is a home PLMN of the UE, is provided. The arrangement comprises means for receiving a first FQDN, wherein the first FQDN comprises an identity of the UE and the home PLMN is aware of an identity of the visited PLMN. The arrangement comprises means for selecting based on the received identity of the user that the UE should establish connection only to a gateway in the visited PLMN, means for transmitting by a home PLMN DNS server a CNAME resource record comprising a third FQDN to be used instead of the first received FQDN and to be sent to a visited PLMN DNS server, whereby the third FQDN is constructed by means of a W-APN network identifier and the identity of the visited PLMN, such that the visited PLMN DNS server can send a gateway address to the UE by resolving the third FQDN.

According to sixth aspect an arrangement in a UE for determining a gateway to connect to, wherein the UE is located in an access network connected to a visited PLMN of a UE and the UE belongs to a home PLMN is provided. The arrangement comprises means for including a first FQDN that comprises a domain name belonging to the home PLMN into a DNS request, means for including an identity of the visited PLMN into the first FQDN, and means for receiving an address to a gateway in the visited PLMN if the home PLMN has selected that the UE should connect to a gateway in the visited PLMN or/and an address to a gateway in the home PLMN if the home PLMN has selected that the UE should connect to a gateway in the home PLMN at least based on the identity of the visited PLMN of the UE.

Thus, a main advantage achieved by the present invention is that the HPLMN is allowed to make the decision whether local breakout should be selected. This is advantageous since the HPLMN is aware of policies and other properties that are relevant when making the decision.

Another advantage is that the solution according to an embodiment can also be used to provide a mechanism that in the TTG case ensures that for a given user, all tunnels towards W-APNs served from the same GGSNs be directed to the same TTG.

A further advantage is that the solution according to an embodiment can be extended with flexible support for simultaneous local breakout and home tunneling using dual tunnels, one local breakout tunnel and one home tunnel. Selection of which tunnel to use is made on a per packet basis (although in practice it will be equivalent to per flow basis) using packet filters.

A further advantage is that the solution can also be used in stepwise evolved scenarios, where the IPsec tunnel endpoint is moved to the WAG or the AEN (or an AEN like node e.g. a GSN+) (with the PDG/TTG functions merged into the AEN/GSN+).

A further advantage is that the present invention according to embodiments allows DNS indication of PDG/TTG (or GSN+ or AEN) on a W-APN and user identity basis instead of based on the W-APN only, i.e. the flexibility of the control means is increased.

A further advantage is that the solution is transparent to the WLAN access network and the visited 3GPP network (VPLMN), affecting only the home network (HPLMN) and the terminal/UE.

A further advantage is that the solution may be provided to an operator without standardization, provided that both the solution's home network components and its terminal components (as customized terminals or possibly as downloadable software) are delivered from the same vendor.

A further advantage is that the solution also may be used in other types of non-3GPP access networks than WLAN, provided that the I-WLAN tunneling solution is used for interworking between the access network and a 3GPP PLMN.

A further advantage is that the basic concept of the solution may be reused in an AEN selection/allocation procedure in one of the long-term evolved network architectures that has been considered for the evolution of 3GPP networks.

A yet further advantage is that the basic concept of the solution may be reused in a s-IASA selection/allocation procedure in another of the long-term evolved network architectures considered for 3GPP SAE.

BRIEF DESCRIPTION OF THE DRAWINGS

FIGS. 5a and 5b are flowcharts of the methods according to the present invention.

DETAILED DESCRIPTION

Figure 1A:
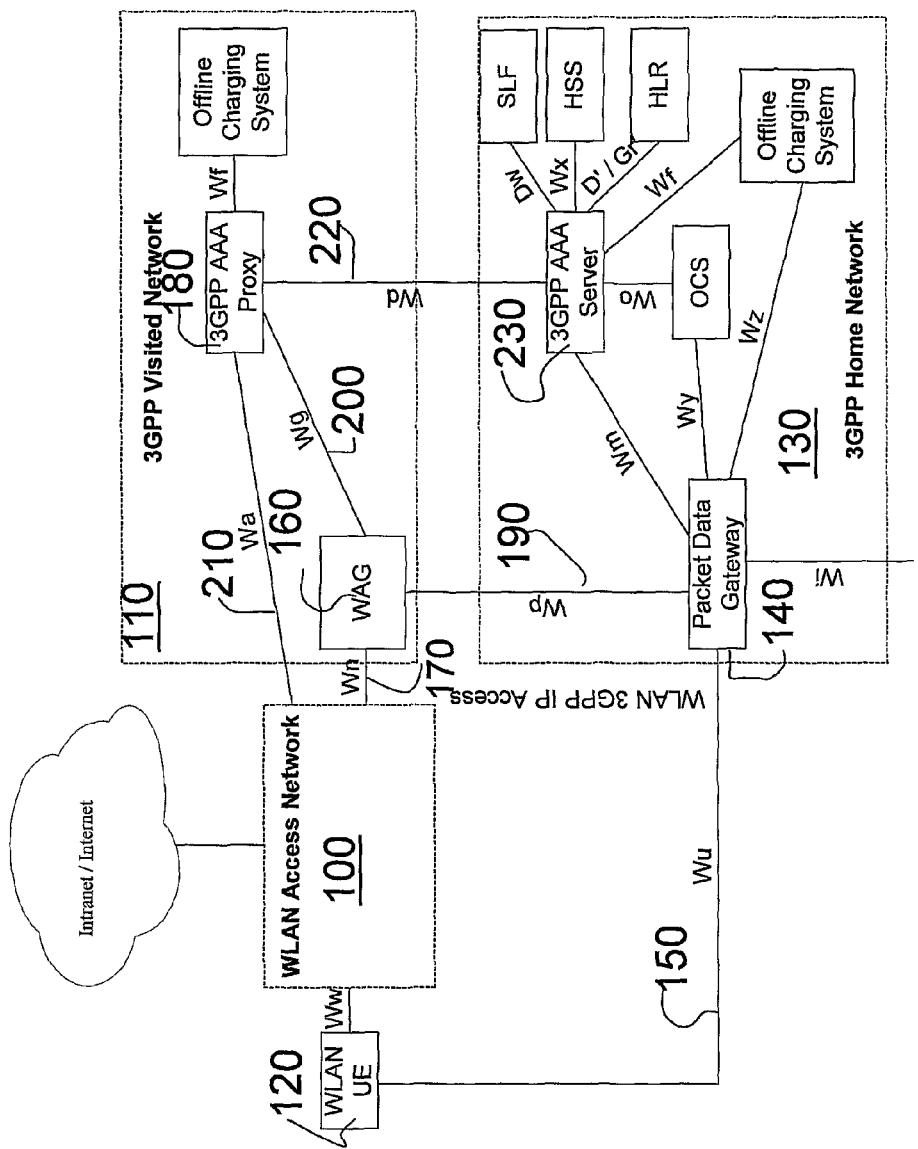
FIG. 1a illustrates I-WLAN wherein the present invention may be implemented.

The basic mechanisms of the solution are described in the context of local breakout in I-WLAN. More or less the same mechanisms are reused for the other applications of the invention, i.e. selection/allocation of AEN/s-IASA and HA/h-IASA in the evolved 3GPP multi-access architecture.

The basic concept is to move the choice of DNS server, and thus the choice of local breakout or home tunneling, from the user/UE to the HPLMN, since the HPLMN can, based on its policies, choose local breakout or home tunneling. If the HPLMN chooses local breakout, it may retrieve the required PDGv/TTGv address(es) from the VPLMN. When choosing between home tunneling and local breakout the HPLMN may consider any relevant input data, such as W-APN, subscription parameters, VPLMN and possibly other parameters such as location, time of day etc.

The movement of the selection of home tunneling versus local breakout is achieved by mandating that the user/UE always constructs an FQDN that indicates the HPLMN, i.e. it should construct an FQDN using the W-APN Network Identifier and the HPLMN ID as the Operator Identifier. While such a "home FQDN" indicates the HPLMN, and would cause a DNS query to be resolved by the HPLMN, it does not contain enough information for the HPLMN to make policy based decision on whether to use home tunneling or local breakout.

In order for the HPLMN to be able to apply the correct policy, it must know the identity of the user that originates the DNS request. Therefore, the user/UE includes the user ID in the FQDN in the DNS request in accordance with the present invention. The user ID may be included before the regular home FQDN, giving it the format <user ID>.<regular home FQDN>. It is also possible to clearly separate the two parts with a dedicated delimiter string, e.g. "zzzz", resulting in the format <user ID>.<delimiter string>.<regular home FQDN>.

It is then the choice of the HPLMN to return one or more IP address(es) of one or more PDGs/TTGs in either the HPLMN (i.e. if home tunneling is selected) or the VPLMN (i.e. if local breakout is selected). In the former case the DNS server in the HPLMN can form the response. In the latter case the HPLMN modifies the received FQDN and sends it in a DNS request to the VPLMN in order to retrieve one or more IP address(es) of one or more PDGs/TTGs in the VPLMN, which then is(are) included in the DNS response from the HPLMN. It should be noted that "DNS request" is used herein as a synonym of the more commonly used term "DNS query".

Further, the HPLMN must be aware of the identity of the concerned VPLMN. There are two reasons for that. The first reason is that it may affect the outcome of the policy decision (i.e. local breakout or home tunneling). The second reason is that in case local breakout is chosen, the HPLMN needs to know from which VPLMN to retrieve the PDGv/TTGv address(es). In one embodiment of the invention the UE is adapted to include the VPLMN ID in the FQDN in order to inform the HPLMN, e.g. after the user ID, so that the format becomes <user ID>.<VPLMN ID>.<regular home FQDN> or <user ID>.<delimiter string>.<VPLMN ID>.<delimiter string>.<regular home FQDN>. In another embodiment of the invention the VPLMN ID is not included in the FQDN. Instead the VPLMN identity is retrieved by the HPLMN during a preceding WLAN access AAA procedure for the concerned user (indicated by the user ID in the FQDN) in order to find out which the concerned VPLMN is. The latter embodiment obviously requires that the optional access authentication in the WLAN access network has been performed.

When the UE has received the PDG/TG IP address(es) the subsequent IPsec tunnel establishment procedure is the same as in the existing solution.

The user ID in the FQDN could be either only the name part of the NAI or the full NAI. The former case can be used if the name part alone is unambiguous, i.e. in principle if the HPLMN uses the same realm part for all its users. In the latter case the "@" character, which is not an allowed character in an FQDN, can be replaced by a dedicated delimiter string, e.g. ".at.". A name part ending with ".at" and a realm part beginning with "at." could then potentially cause ambiguity. To avoid this risk it can be allowed to have either the name part ending with ".at" or the realm part beginning with "at.", but both cannot be allowed. The easiest is to keep the flexibility in the name part (i.e. allowing the name part to end with ".at") and let the home operator ensure that no valid realm (that can constitute the realm part of a NAI) begins with "at.".

Figure 7:
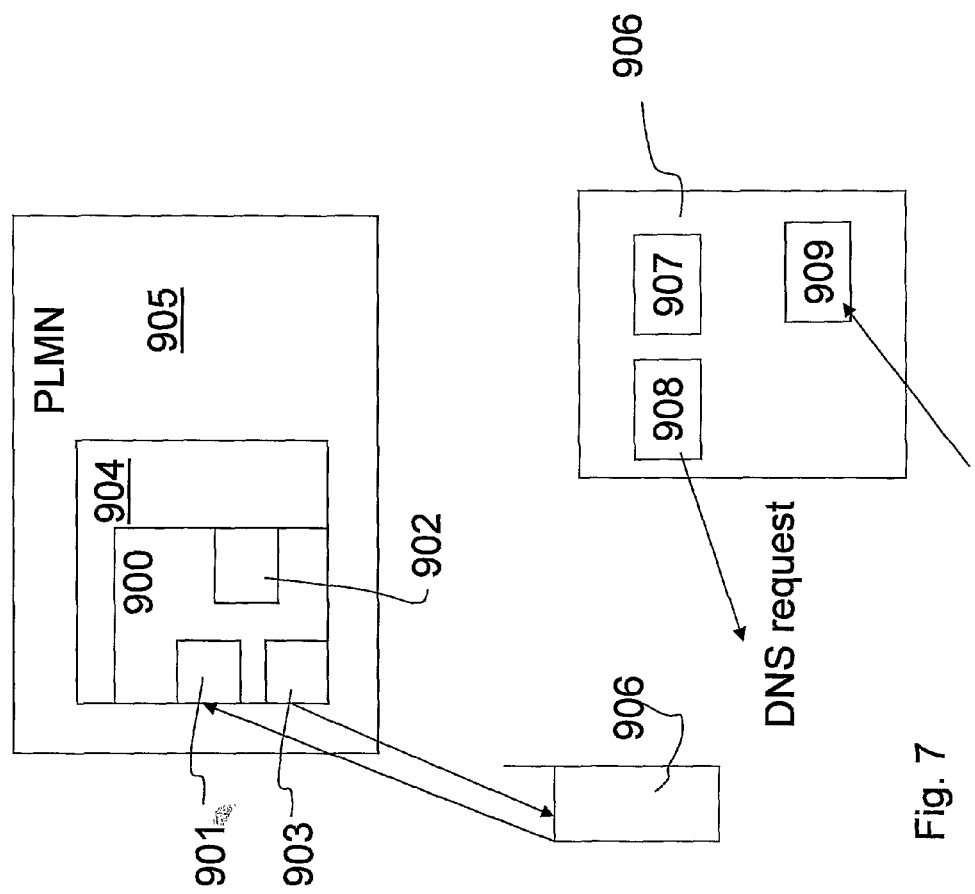
FIG. 7 illustrates schematically the arrangements of the present invention.

Thus, the present invention provides an arrangement 900 illustrated in FIG. 7 to be implemented in one or more nodes 904 in a PLMN 905 for selecting a gateway to which to connect a UE 906 located in an access network connected to a visited PLMN of a UE, wherein the PLMN is a home PLMN of the user of the UE. That implies that the UE comprises a SIM card, whereby the user registered to the SIM-card belongs to the home PLMN. The arrangement comprises means 901 for receiving a first FQDN, whereby the first FQDN comprises an identity of the user of the UE. The home PLMN is aware of an identity of the visited PLMN. The arrangement comprises means for selecting 902, at least based on the received identity of the user, whether the UE should establish connection only to a gateway in the home PLMN, only to a gateway in the visited PLMN or to both a gateway in the home PLMN and a gateway in the visited PLMN and means for transmitting 903 an address belonging to a gateway in the visited PLMN if connection only to a gateway in the visited PLMN is selected or an address belonging to a gateway in the home PLMN if connection only to a gateway in the home PLMN is selected or addresses belonging to both a gateway in the home PLMN and a gateway in the visited PLMN if connection to both is selected.

Further, the invention relates to an arrangement in a UE comprising means for including 907 a first FQDN that comprises a domain name belonging to the home PLMN into a DNS request, means for including 908 an identity of the user of the UE into the first FQDN, and means for receiving 909 an address to a gateway in the visited PLMN if the home PLMN has selected that the UE should connect to a gateway in the visited PLMN or/and an address to a gateway in the home PLMN if the home PLMN has selected that the UE should connect to a gateway in the home PLMN at least based on the identity of the user of the UE. It should be noted that the means for including may also be able to include an identity of the visited PLMN.

Figure 8A:
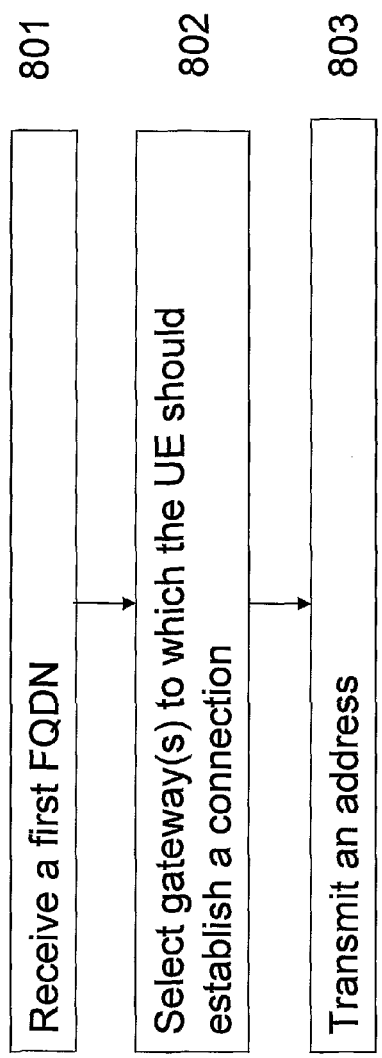

The present invention also relates to a method in a PLMN for selecting a gateway to which to connect a UE located in an access network connected to a visited PLMN of a user of the UE, wherein the PLMN is a home PLMN of the user of the UE. The method is illustrated in FIG. 8a and comprising the steps of receiving a first FQDN 801, wherein the first FQDN comprises an identity of the user of the UE and the home PLMN is aware of an identity of the visited PLMN, and the further steps of selecting 802 based on the received identity of the user whether the UE should establish connection only to a gateway in the home PLMN, only to a gateway in the visited PLMN or to both a gateway in the home PLMN and a gateway in the visited PLMN, Transmitting 803 an address belonging to a gateway in the visited PLMN if connection only to a gateway in the visited PLMN is selected or an address belonging to a gateway in the home PLMN if connection only to a gateway in the home PLMN is selected or addresses belonging to both a gateway in the home PLMN and a gateway in the visited PLMN if connection to both is selected.

The present invention also relates to a method in a UE for determining a gateway to connect to, wherein the UE is located in an access network connected to a visited PLMN of a user of the UE and the user of the UE belongs to a home PLMN. The method is illustrated in the flowchart of FIG. 5b and comprising the steps of including 804 a first FQDN that comprises a domain name belonging to the home PLMN into a DNS request, including 805 an identity of the user of the UE into the first FQDN, and receiving 806 an address to a gateway in the visited PLMN if the home PLMN has selected that the UE should connect to a gateway in the visited PLMN or/and an address to a gateway in the home PLMN if the home PLMN has selected that the UE should connect to a gateway in the home PLMN at least based on the identity of the user of the UE.

Figure 2:
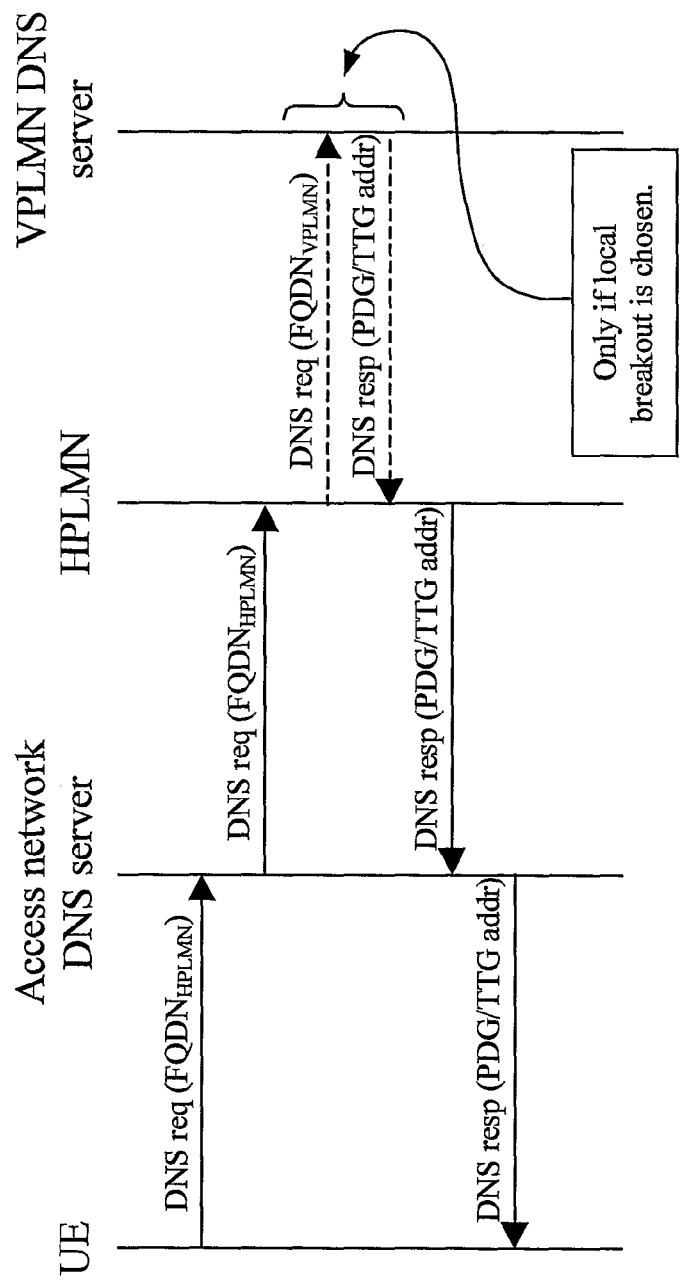
FIGS. 2 to 6 are signal diagrams showing embodiments of the present invention.

The general procedure is further illustrated in FIG. 2. The UE sends a DNS request to the DNS server in the WLAN access network in order to resolve the FQDN it has constructed (denoted $FQDN_{HPLMN}$ in FIG. 2). The WLAN access network DNS server, which cannot resolve the special FQDN itself, forwards the request to the HPLMN.

The HPLMN extracts the user ID and the W-APN from the received FQDN to be input data to the policy decision. In the embodiment in which the VPLMN ID is included in the FQDN the HPLMN extracts the VPLMN ID too. In the embodiment in which the VPLMN ID is not included in the FQDN the HPLMN checks the data stored during the preceding network access procedure, e.g. in the AAA server, to find out which the concerned VPLMN is (provided that the HPLMN needs this information for the policy decision and/or the DNS processing). In both embodiments the HPLMN then decides whether home tunneling or local breakout should be used.

If home tunneling is selected, the HPLMN returns one or more PDGh/TTGh addresses. If local breakout is chosen, the HPLMN constructs an FQDN (denoted $FQDN_{VPLMN}$ in FIG. 2) using the W-APN Network Identifier and the VPLMN ID as the Operator Identifier (i.e. the same kind of FQDN that the UE would construct in the existing solution for local breakout) and sends a DNS request to the VPLMN to resolve it. The VPLMN returns one or more PDGv/TTGv addresses) which the HPLMN includes in its DNS response towards the WLAN access network and the UE. The HPLMN may avoid sending the DNS request to the VPLMN, if it has cached data for the concerned FQDN from a previous response from the VPLMN or if the HPLMN has configured PDGv/TTGv addresses) for the concerned VPLMN. The DNS response from the HPLMN should have a lifetime (Time-to-Live, TTL) set to zero, indicating that the response is valid during the time zero (i.e. only for this particular request), in order to avoid that the DNS server in the WLAN access network (or another possibly present intermediate DNS server) or the DNS resolver in the UE caches the FQDN-IP address mapping (which could eliminate the HPLMN's possibility to make a (different) policy decision in a subsequent resolution of the same FQDN). A "DNS resolver" is the DNS software in a host (e.g. the UE/terminal) that forms an interface between applications and the DNS infrastructure.

When the UE has received the PDG/TTG addresses), it can proceed with the IPsec tunnel establishment in the regular manner.

Figure 3:
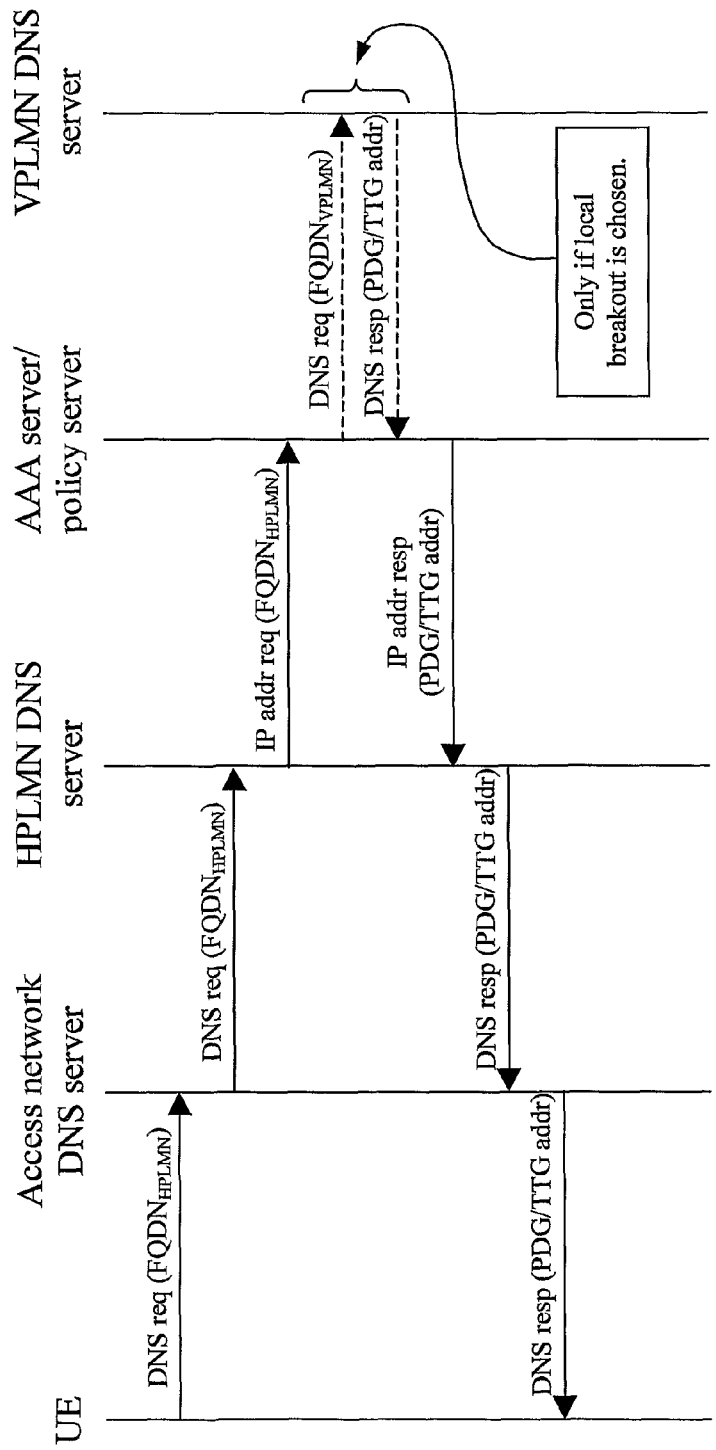
Figure 4:
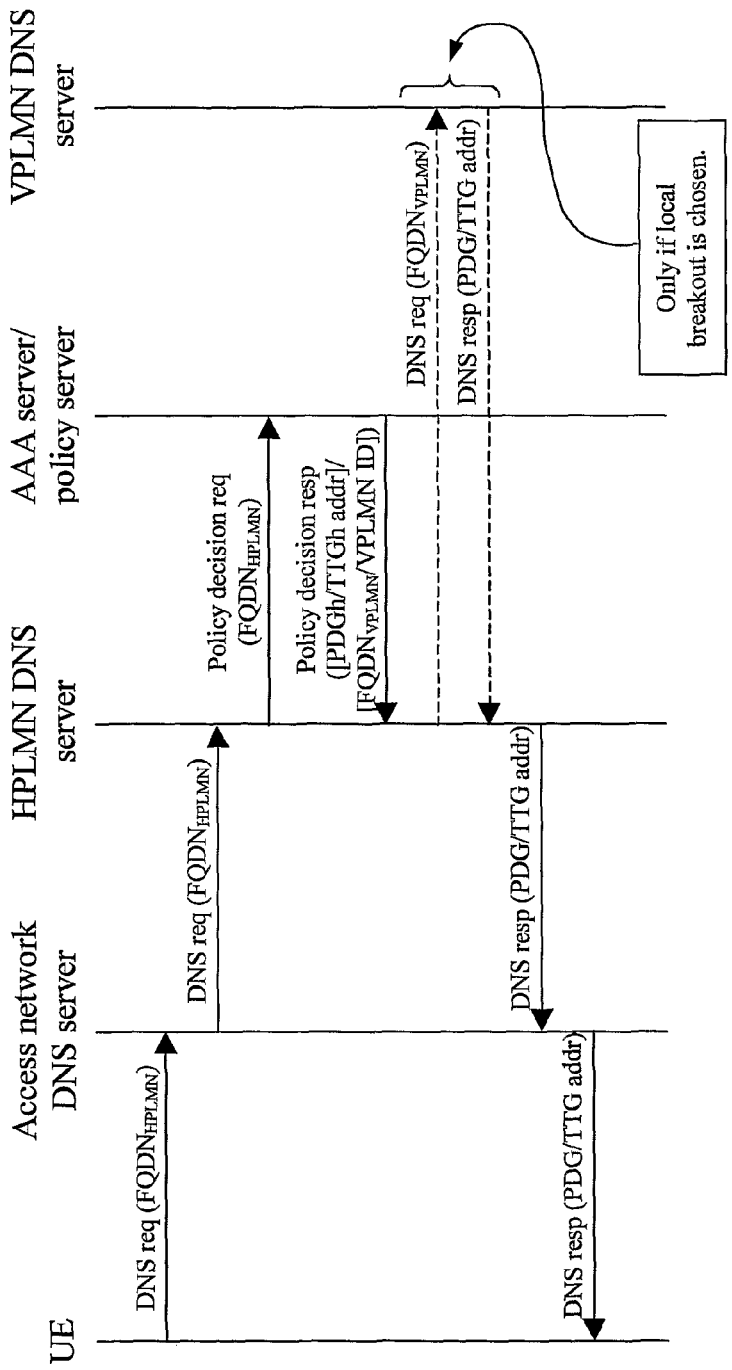

In FIG. 3 and FIG. 4 the signaling sequence diagram for the modified DNS procedure is slightly more detailed, since the HPLMN DNS server is separated from other involved HPLMN entities. (Although depicted and described as a single entity, the HPLMN DNS server may be multiple DNS servers responsible for different parts of the HPLMN's domain name space, in line with the distributed nature of the DNS system in general.) When the HPLMN DNS server is separated the general procedure diverges into two sub-variants, one of which is illustrated in FIG. 3 and the other is illustrated in FIG. 4. In both sub-variants the HPLMN DNS server consults the AAA server and/or a policy server in order to get a home tunneling/local breakout decision and to eventually resolve the FQDN.

In FIG. 3 the AAA server/policy server not only makes the home tunneling/local breakout decision, it also retrieves/chooses the PDG/TTG addresses) and returns the address(es) to the HPLMN DNS server. The AAA server and the policy server may be a single entity or separate entities. In the home tunneling case PDGh/TTGh addresses are configured internally in the HPLMN, but in the local breakout case the PDGv/TTGv address(es) must be retrieved from the VPLMN (unless the address(es) are cached or configured in the HPLMN). To do this the AAA server/policy server constructs the above-described $FQDN_{VPLMN}$ and resolves it through a regular DNS procedure. Then the AAA server/policy server sends the PDGv/TTGv address(es) to the HPLMN DNS server.

In FIG. 4 the interaction between the HPLMN DNS server and the AAA server/policy server is different. The AAA server/policy server returns an indication of the policy decision (i.e. home tunneling or local breakout), but not necessarily any address. In the home tunneling case the AAA server/policy server may return one or more PDGh/TTGh address(es), but it is also possible that these addresses are configured in the HPLMN DNS server. In the local breakout case the AAA server/policy server may return only an indication of the policy decision and let the HPLMN DNS server do the rest (i.e. constructing the $FQDN_{VPLMN}$ and retrieving the corresponding PDGv/TTGv address(es) from the VPLMN, unless the address(es) is/are already cached in the HPLMN DNS server). This however requires that the variant with the VPLMN ID included in the $FQDN_{HPLMN}$ is used. If the VPLMN ID is not included in the $FQDN_{HPLMN}$, the AAA server/policy server must return the VPLMN ID or possibly the entire $FQDN_{VPLMN}$ (depending on how you wish to distribute the intelligence between the HPLMN DNS server and the AAA server/policy server). Also in this case the HPLMN DNS server retrieves the PDGv/TTGv addresses) from the VPLMN, unless the address(es) is/are already cached in the HPLMN DNS server.

Figure 5:
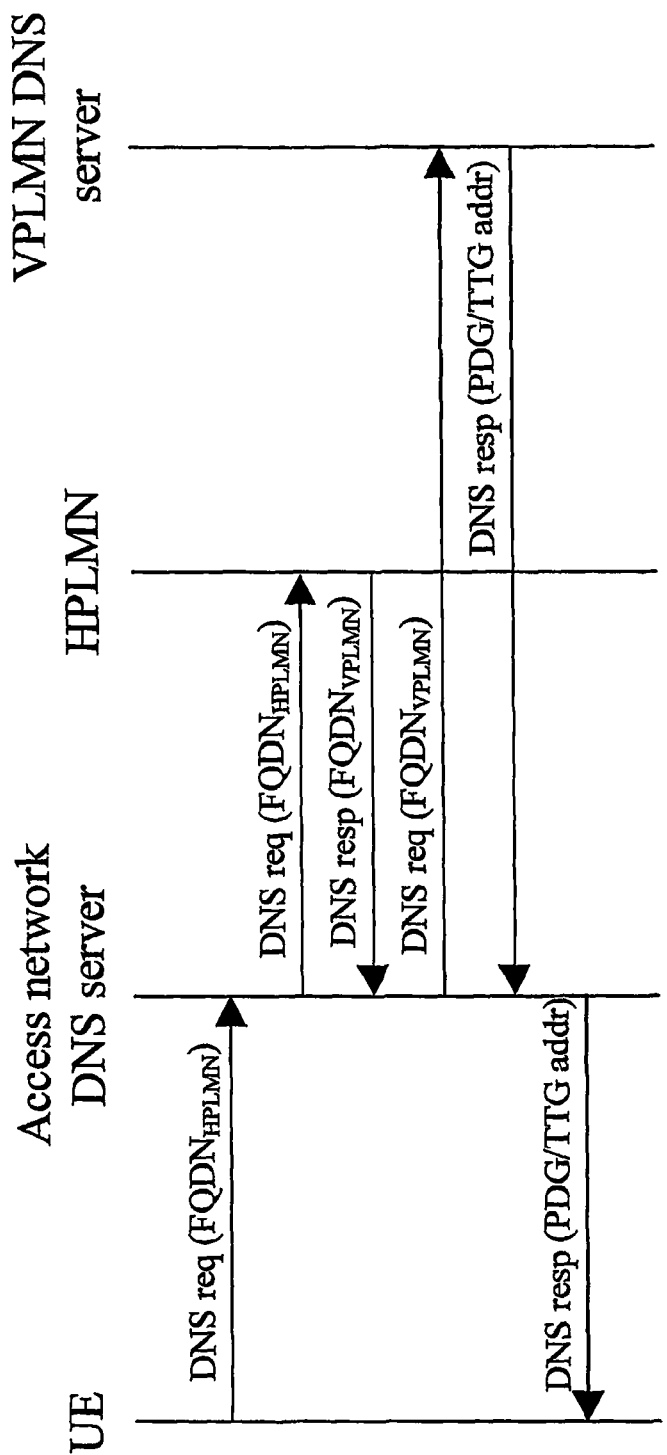
Figure 6:
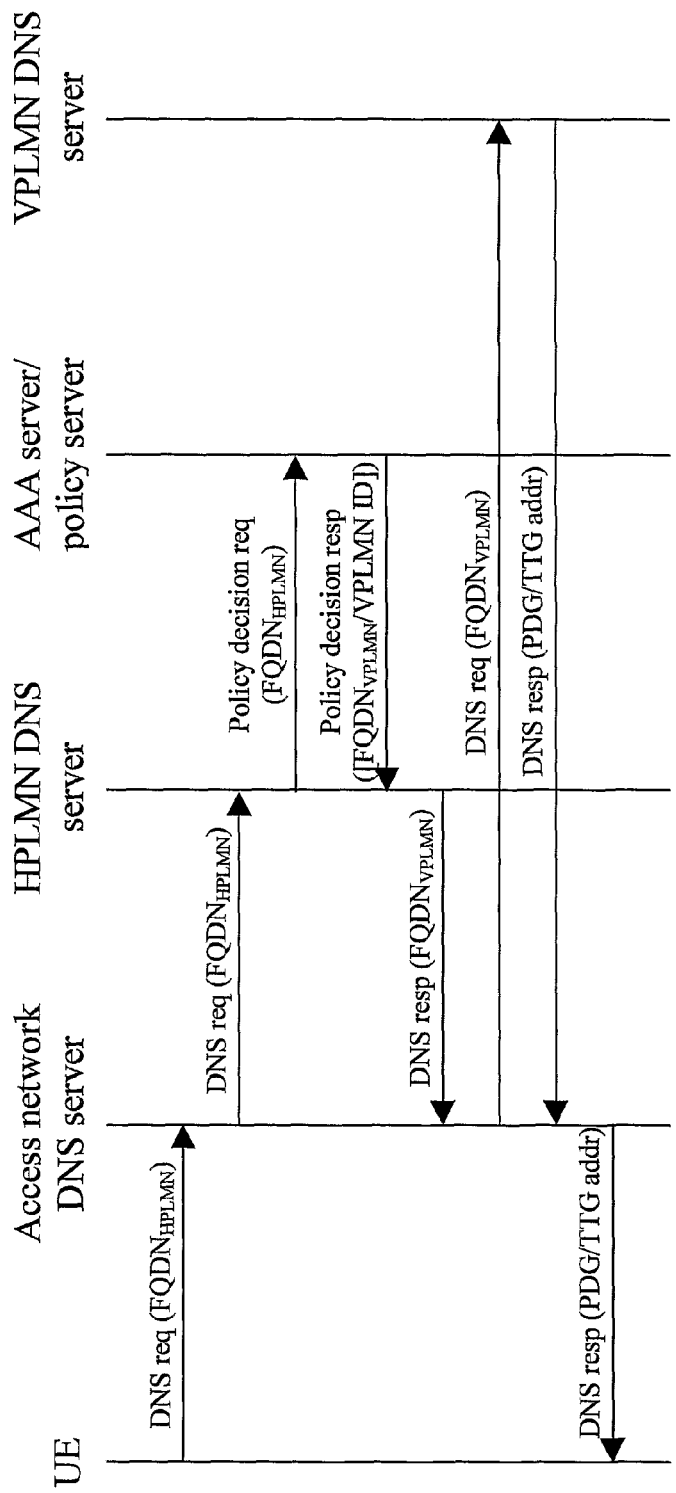

The alias—canonical name (CNAME) feature of DNS (see P. Mockapetris, "DOMAIN NAMES—CONCEPTS AND FACILITIES", RFC 1034, November 1987) can also be used. Then the HPLMN would not itself retrieve the PDGv/TTGv address(es) in the local breakout case. Instead the HPLMN DNS server would return a CNAME resource record in its response, including an FQDN to be used instead of the FQDN in the original DNS request. The returned new FQDN would be the $FQDN_{VPLMN}$ that is constructed using the W-APN Network Identifier and the VPLMN ID as the Operator Identifier (i.e. the same kind of FQDN that the UE would construct in the existing solution for local breakout). Since the $FQDN_{VPLMN}$ indicates the VPLMN, the access network DNS server sends a new request to the VPLMN DNS server to have the $FQDN_{VPLMN}$ resolved. (It is possible to send the DNS response with the $FQDN_{VPLMN}$ (included in a CNAME resource record) all the way to the UE and let the DNS resolver in the UE restart the DNS request with the new FQDN. This would not make any difference to the principles of the solution, so since the usual DNS behaviour is not to send a CNAME response to the host (unless the host explicitly asked for a CNAME response), it is assumed in this description that the access network DNS server restarts the DNS request using the received $FQDN_{VPLMN}$. It is also conceivable that other DNS servers, e.g. another DNS server owned by the HPLMN operator, have been consulted before reaching the HPLMN DNS server, and that one of these DNS servers, in case the DNS recursive mode is used, receives the DNS response with the $FQDN_{VPLMN}$ and restarts the DNS request with the new FQDN instead of sending the $FQDN_{VPLMN}$ to the access network DNS server. However, it is chosen to illustrate only what is regarded as the most interesting case.) The VPLMN DNS server responds with one or more PDGv/TTGv IP address(es) and the access network DNS server forwards the response to the UE. When the UE has received the PDG/TTG address(es), it can proceed with the IPsec tunnel establishment in the regular manner. FIG. 5 and FIG. 6 illustrate the message flows for this variant in the local breakout case. (Since the CNAME feature would only be used in the local breakout case, FIG. 2, FIG. 3, FIG. 4 still apply to the home tunneling case.)

Thus the arrangement illustrated in FIG. 7 comprises according to another aspect means for selecting 902 based on the received identity of the user that the UE should establish connection only to a gateway in the visited PLMN, means for transmitting 903 by a home PLMN DNS server a CNAME resource record comprising a third FQDN to be used instead of the first received FQDN and to be sent to a visited PLMN DNS server, whereby the third FQDN is constructed by means of a W-APN network identifier and the identity of the visited PLMN, such that the visited PLMN DNS server can send a gateway address to the UE by resolving the third FQDN.

FIG. 5 illustrates the procedure when the CNAME feature is used in the local breakout case. It shows how the HPLMN returns the $FQDN_{VPLMN}$, so that the access network DNS server can restart the DNS request with the new FQDN, i.e. retrieve the PDGv/TTGv address(es) from the VPLMN DNS server.

In FIG. 6 the DNS server and the AAA server/policy server in the HPLMN are shown separately, malting the message sequence diagram slightly more detailed than in FIG. 5. The AAA server/policy server may return only an indication of the policy decision and let the HPLMN DNS server construct the $FQDN_{VPLMN}$. This however requires that the embodiment with the VPLMN ID included in the $FQDN_{HPLMN}$ is used. If the VPLMN ID is not included in the $FQDN_{HPLMN}$, the AAA server/policy server must return the VPLMN ID or possibly the entire $FQDN_{VPLMN}$ (depending on how you wish to distribute the intelligence between the HPLMN DNS server and the AAA server/policy server).

The example message sequences in this section all assume that the DNS recursive mode is used, which is common practice. If the non-recursive (iterative) mode were used, the HPLMN DNS server would have to use the CNAME feature in the local breakout case to return the $FQDN_{VPLMN}$ (i.e. the FQDN that the UE would construct if selecting local breakout in the existing solution), which could then be included in a second DNS request from the UE (or the access network DNS server) Alternatively, the HPLMN DNS server could override the non-recursive indication and retrieve the PDGv/TTGv addresses) from the VPLMN DNS server anyway. Other than this, use of the DNS non-recursive mode would only change the sequence of DNS messages, but the principles of the solution would remain the same.

As stated above, the present invention is described in the context of I-WLAN. Extensions and variations in the I-WLAN context are also possible according to embodiments of the present invention.

The concept of including the user ID in the FQDN may also be used to ensure that for a given user, all tunnels towards W-APNs served from the same GGSNs should be directed to the same TTG. With this concept the HPLMN has access to both the W-APN and the user ID, when allocating the TTG address via DNS. Thus the HPLMN can ensure that the same TTG is allocated when required as described above.

The intelligence providing this coordination can be placed in the HPLMN DNS server or in the AAA server/policy server in the HPLMN. This will however only work when the TTG is allocated in the HPLMN, i.e. a TTGh. To work when the TTG is allocated in the VPLMN, i.e. a TTGv, the solution has to be extended so that the user ID can be included in the FQDN that is sent in the DNS request to the VPLMN DNS server too. Then the VPLMN can perform the same per-user coordination as the HPLMN and ensure that the same TTGv is allocated when required.

The solution can be extended to support simultaneous local breakout and home tunneling according to an embodiment, even for the same W-APN. This would improve the flexibility of the HPLMN's control of the traffic streams, increasing the granularity of the control means from the rather coarse per W-APN basis.

The use of simultaneous local breakout and home tunneling should be a decision made by the HPLMN. Packet filters are used to control what packets that are sent through the respective tunnels. To indicate to the US that simultaneous local breakout and home tunneling is to be used the HPLMN returns both one or more PDGh/TTGh addresses) and one or more PDGv/TTGv address(es) in response to the DNS request. Alternatively, the HPLMN returns one or more PDGh/TTGh address(es) and a CNAME record that can be resolved into one or more PDGv/TTGv address(es) through another DNS request. Possibly the order of occurrence of PDGh/TTGh and PDGv/TTGv could indicate whether home tunneling or local breakout should be the default mechanism for packets that do not match any packet filter.

For a certain W-APN, the choice of local breakout or home tunneling (when both are used simultaneously) for a packet sent from the UE may be based on packet filters according to one embodiment. The packet filters may be based on parameters such as: IP source address, IP destination address, Transport protocol (e.g. TCP or UDP), i.e. the protocol number field in IPv4 or the next header field in IPv6, Source port number, Destination port number, Ape of service (TOS) (IPv4), Traffic class (IPv6).

The packet filters may be of the same or similar format as the Traffic Flow Templates (TFTs) specified for GPRS/UMTS (see 3GPP TS 23.060 v6.8.0, "3$^{rd}$ Generation Partnership Project; Technical Specification Group Services and System Aspects; General Packet Radio Service (GPRS); Service description; Stage 2 (Release 6)), but other formats serving a similar purpose would also do. It should also preferably be possible to specify relative packet filters in the sense that its parameters are specified in relation to dynamic parameters related to the UE and the present traffic flows, e.g. the destination address and the UE IP address used as the source address. For instance, a packet filter could state that a packet that has a destination address in the same address range as the IP address the UE has received from the VPLMN should be sent using local breakout.

Similar/corresponding packet filters could also be sent to the PDGh/TTGh, the PDGv/TTGv and/or the WAG through the AAA infrastructure (as described above), so that the HPLMN and the VPLMN can police the traffic streams through the respective tunnels.

The packet filters governing the traffic flows can be conveyed to the UE in several ways. The easiest way is through configuration of the USIM application on the UICC. These configurations may be stored at subscription time, but it would also be possible for the HPLMN to update them dynamically using the available mechanisms for "over the air" modification of data on the UICC. Configuring the packet filters in the terminal equipment (outside the UICC) would also be possible, but less preferable, because then the packet filters would be tied to the terminal device instead of the subscriber.

A more advanced method than configuration is to dynamically convey the packet filters when needed. The various means for this may include: EAP during UE-PDG/TTG IPsec tunnel establishment, EAP during WLAN access authentication, DNS, and Separate retrieval.

The packet filters may be conveyed by using Extensible Authentication Protocol (EAP) during UE-PDG/TTG IPsec tunnel establishment. Thus the packet filters can be piggybacked on the EAP packets, utilizing a mechanism for generic data transfer through EAP. This generic data transfer mechanism may be the generic container attribute or any of the means for generic data transport that exist in various EAP methods. The term generic container attribute is further described in the published international applications WO2004/112348, WO2004/112349 and WO2004/112347.

The packet filters conveyed through this method may be used to identify the packets that are to be passed through the tunnel, whose establishment process the EAP procedure is associated with. In addition, the packet filters may be accompanied by an indication of whether this tunnel is the default tunnel for the concerned W-APN.

This means that there will be two transfers of packet filters, when simultaneous local breakout and home tunneling is used, one associated with each tunnel establishment.

The packet filters can also be piggybacked on EAP packets, using the same mechanisms as mentioned above, during the user authentication associated with WLAN network access. In this case the HPLMN does not yet know what W-APN the UE will use in its subsequent UE-PDG/TTG tunnel establishment request. Therefore the HPLMN has to include packet filters associated with all W-APNs that are included in the user's subscription.

In addition, DNS may also be used to convey packet filters from the HPLMN to the UE, when the UE attempts to resolve an FQDN into one or more PDG/TTG address(es). In this case the HPLMN knows the concerned W-APN, so only the packet filters associated with the concerned W-APN need to be transferred.

The DNS TXT resource records (see P. Mockapetris, "DOMAIN NAMES—IMPLEMENTATION AND SPECIFICATION", RFC 1035, November 1987), which include text strings, may be used to convey packet filters. A well-defined format for the packet filter definitions would have to be used internally in the TXT resource records, but this format would be unknown to the DNS system. The structured use of TXT resource records suggested in R. Rosenbaum, "Using the Domain Name System To Store Arbitrary String Attributes", RFC 1464, May 1993 may be used when defining the packet filter definition format.

Another way would be to define a new DNS resource record for this purpose. The new resource record would not have to be widely adopted outside the 3GPP sphere, since unknown resource records are handled transparently by the DNS system. It could even be a proprietary mechanism that is implemented only in an HPLMN and in the terminal software of its subscribers.

Although more delay is introduced it is possible to introduce a separate procedure for dynamic retrieval of packet filters. The UE could retrieve the packet filters from the HPLMN e.g. using the HyperText Transfer Protocol (HTTP) (preferably protected by Transport Layer Security (TLS), Secure Sockets Layer (SSL) or Secure HTTP (S-HTTP)). The Uniform Resource Identifier (URI) to use in the HTTP request could be a combination of a preconfigured part and a dynamic part, the dynamic part including the W-APN, the user ID and possibly the VPLMN ID (if the VPLMN ID is not included the HPLMN has to consult its AAA server to retrieve the VPLMN ID). If the packet filters are retrieved for one tunnel at a time (i.e. separate retrieval procedures for the packet filters for the local breakout tunnel and the packet filters for the home tunnel), then the URI should also include an indication of whether the request concerns the local breakout tunnel or the home tunnel. This indication may either belong to the configured part (in which case two part URIs need to be configured in the USIM, one for each tunnel).

To avoid configuring any part of the URI in the USIM the URI may be transferred from the HPLMN to the UE prior to the retrieval of the packet filters. The HPLMN could transfer either the full URI or only the part of the URI that is non-session specific (i.e. excluding the W-APN, the user ID, the VPLMN ID and possibly the local breakout tunnel/home tunnel indicator). The local breakout tunnel/home tunnel indicator could be seen as a session specific part of the URI, in which case it may be added by the UE to a retrieved non-session specific part of the URI. However, it could also be seen as a non-session specific part of the URI, in which case it would be included in the part of the URI that is conveyed from the HPLMN. The latter case has the advantage that the UE does not have to be aware of whether an IPsec tunnel it is establishing is a local breakout tunnel or a home tunnel.

The full or non-session specific part of the URI may be conveyed to the UE using any of the above described mechanisms for transferring the packet filters.

If the full or non-session specific part of the URI is conveyed using EAP during the UE-PDG/TG IPsec tunnel establishment, then the subsequent packet filter retrieval would only return packet filters that are associated with the concerned tunnel. Consequently the URI has to include a local breakout tunnel/home tunnel indication, which either is transferred from the HPLMN or added by the UE. The full or non-session specific URI could be conveyed using a means for generic data transport in EAP or, in case Protected Extensible Authentication Protocol version 2 (PEAPv2) is used, the URI TLV (where TLV denotes a type-length-value encoded attribute).

If the full or non-session specific part of the URI is conveyed using EAP during the WLAN access authentication procedure, the concerned tunnels have not been established yet. Consequently, the information conveyed from the HPLMN must be sufficient for the UE to construct the required URIs for any of the W-APNs that the user subscribes to (and for both the local breakout tunnel and the home tunnel). That is, if the HPLMN transfers full URIs, it has to transfer either one URI for each subscribed W-APN (if packet filters for both a local breakout tunnel and a home tunnel can be retrieved in a single procedure) or two URIs for each subscribed W-APN, one for each tunnel (if the packet filters are to be retrieved separately for each tunnel).

If the HPLMN transfers only part URIs, there are three cases. If a single procedure is used to retrieve packet filters for both a local breakout tunnel and a home tunnel, then the HPLMN only needs to transfer a single non-session specific URI part. If packet filters are retrieved for one tunnel at a time, the HPLMN may either transfer two part URIs, one for local breakout tunnels and one for home tunnels, or transfer a single non-session specific URI part and leave to the UE to add the local breakout tunnel/home tunnel indicator.

When EAP is used to convey URIs or part URIs, then the full or non-session specific URI could be conveyed using either a means for generic data transport or, in case PEAPv2 is used, the URI TLV.

If DNS is used to convey URIs or part URIs, the HPLMN acts differently depending on whether the packet filters for a local breakout tunnel and a home tunnel are retrieved in a single procedure or separate procedures. If a single procedure is used, then the HPLMN transfers either a single full URI or a single non-session specific URI part. If separate retrieval procedures are used, the HPLMN may transfer two full URIs (one for each tunnel), two URI parts (one for each tunnel, i.e. including local breakout tunnel/home tunnel indicators) or a single URI part, leaving to the UE to add the local breakout tunnel/home tunnel indicator.

A more advanced type of packet filter could consider not only characteristics of the packet itself, but also the time (e.g. time of day or day of week), referred to as time sensitive packet filters. Tine information would then accompany each time sensitive packet filter to indicate the time periods when the packet filter is valid.

Alternatively, instead of including the time information with the packet filter instructions, the HPLMN could simply modify the packet filters in the UE and in the concerned PLMN nodes (if the similar/corresponding packet filters are used in PLMN nodes) when needed in order to achieve time sensitive packet filtering. In this case the HPLMN needs a way to communicate with the UE that is always available when the UE is connected to a WLAN access network. The only one of the above described communication means that fulfils this criterion is packet filter configuration in the USIM application with "over the air" modification from the HPLMN. To modify the packet filters in the PLMN nodes (if needed) the HPLMN can use the AAA infrastructure and the active AAA sessions for the concerned user.

The above described usage of packet filters to control the traffic during simultaneous local breakout and home tunneling can be extended to support the WLAN Direct IP Access scenario simultaneously with home tunneling and/or local breakout. The HPLMN would then transfer packet filters to the UE, not only to control what packets that should be sent using home tunneling or local breakout, but also packet filters controlling what packets that should be sent using WLAN Direct IP Access.

The choice of local breakout or home tunneling is controlled by the HPLMN. However, it may be desirable to allow also the user to influence the choice, or at least express preferences in the matter by indicating the user preference in the DNS request. In the basic solution the user's only way to influence the decision is through a possible user profile that the HPLMN may include as a part of the input data to its decision. There is no dynamic per-session mechanism to express preferences.

A way to improve the user's possibilities to influence the local breakout/home tunneling decision with a more dynamic means is to let the user optionally include a preference indication in the FQDN, i.e. an indication of whether the user prefers local breakout or home tunneling for the concerned session. The HPLMN extracts the preference indication (if present) along with the user ID and possibly the VPLMN ID and uses the preference indication as a part of the input data to the local breakout/home tunneling decision.

The preference indication could e.g. consist of the letter "L", indicating that local breakout is preferred, or "H", indicating that home tunneling is preferred. The letter could be preceded by a dedicated string, e.g. "pppp-" that indicates the presence of the optional preference indication in the FQDN, such that the complete format of the preference indication would be "pppp-X", where "X", stands for either "L" or "H".

The location of the preference indication in relation to the user ID and the possible VPLMN ID in the FQDN is not important. The FQDN format (in the embodiment with the VPLMN ID included) could be e.g. <user ID>.<VPLMN ID>.<preference indication>.<regular home FQDN> or <user ID>.<delimiter string>.<VPLMN ID>.<delimiter string>.<preference indication>.<delimiter string>.<regular home FQDN>. If the preference indication is as easily identified as the delimiter string, then the delimiter strings preceding and following the preference indication in the latter FQDN format example are not needed.

Including a user preference indication in the FQDN introduces a new security threat to the DNS procedure, namely that the preference indication is maliciously modified before reaching the HPLMN. Therefore integrity protection of the user preference indication would be preferable.

The DNSSEC Security Extensions (DNSSEC) (e.g. described in R. Arends et al., "DNS Security Introduction and Requirements", RFC 4033, March 2005) do not offer protection of DNS requests—only responses—but nevertheless DNSSEC could be used to indirectly achieve desired protection. If the HPLMN uses DNSSEC to integrity protect its DNS response to the UE and includes the received preference indication, e.g. in a TXT resource record, in the protected response, then the UE can verify that the HPLMN did indeed receive the correct preference indication. If the returned preference indication differs from the one the UE sent to the HPLMN, then the UE should preferably discard the received PDG/TTG address.

Another way to protect the preference indication is to leverage the cryptographic material produced during the preceding WLAN access authentication procedure (provided that the optional access authentication was performed). The cryptographic material could consist of e.g. the CK, the IK, the MSK or the EMSK produced during the EAP-AKA procedure (or corresponding cryptographic material produced during the EAP-SIM procedure). The UE uses this cryptographic material to construct a Message Authentication Code (MAC) that is added to the FQDN. The format of the FQDN (in the embodiment with the VPLMN ID included) would then be e.g. <MAC>.<user ID>.<VPLMN ID>.<preference indication>.<regular home FQDN> or <MAC>. <delimiter string>.<user ID>. <delimiter string>. <VPLMN ID>. <delimiter string>.<preference indication>.<delimiter string>.<regular home FQDN>. If the preference indication is as easily identified as the delimiter string, then the delimiter strings preceding and following the preference indication in the latter FQDN format example are not needed. Similarly, if the HPLMN always knows whether a MAC is included in the FQDN, then the delimiter string between the MAC and the user ID is not needed. The input data to the MAC, i.e. the data that is protected by the MAC, could be only the preference indication, the whole FQDN, the entire DNS request, or anything in between.

If no preceding WLAN access authentication was performed, a possible workaround could be to let the UE generate one or more random number(s), which is(are) fed into the GSM authentication algorithm executing in the SIM. The produced cryptographic material can then be used to generate a MAC as described above. The KC or the IK is then used to generate a MAC as described above. However, in this case the UE also includes the generated random number in the FQDN in order for the HPLMN to be able to derive the same cryptographic material and verity the MAC. The format of the FQDN (using the variant with the VPLMN ID included) could be e.g. <random number>.<MAC>.<user ID>.<VPLMN ID>.<preference indication>.<regular home FQDN> or <random number>.<MAC>.<delimiter string>.<user ID>.<delimiter string>.<VPLMN ID>.<delimiter string>.<preference indication>.<delimiter string>.<regular home FQDN>. As described before, the delimiter strings preceding and following the preference indicator, as well as the delimiter string following the MAC, may not be needed.

Yet a way to battle the security threat would be to let the UE send the preference indication to the HPLMN in a secure manner during the authentication procedure associated with the IPsec tunnel establishment (in addition to sending it unprotected in the DNS request). Then the HPLMN can verify that the preference indication received through DNS was correct. Secure transfer of the preference indication between the UE and the HPLMN could be achieved via the generic data transfer means in EAP methods.

In a possible alternative solution (as applied to the current I-WLAN) an operator's policies regarding the choice between home tunneling and local breakout are the same for all subscribers and instead depend only on the VPLMN and/or the W-APN. In such case, a variation of the solution is that the user/UE includes only the VPLMN ID, but not the user ID, in the FQDN, resulting in the format <VPLMN ID>.<regular home FQDN> or <VPLMN ID>.<delimiter string>.<regular home FQDN>.

The HPLMN would extract the VPLMN ID from the received FQDN and base its choice of home tunneling or local breakout entirely on the VPLMN ID and/or the W-APN. If local breakout is chosen, the HPLMN proceeds as described above in the basic solution for the current I-WLAN, i.e. it constructs an FQDN using the W-APN Network Identifier and the VPLMN ID as the Operator Identifier and sends a DNS request to the VPLMN to resolve it.

The solution, as described for I-WLAN, is not limited to WLAN access networks, but may also be used in conjunction with any non-3GPP access network that interworks with 3GPP PLMNs. This is possible, because the tunneling solution that is used in I-WLAN (or a similar solution), which is a prerequisite for this application of the inventive solution, may be used for access via any type of non-3GPP access network.

The basic solution and its possible extensions have so far been described in terms of the current 3GPP I-WLAN architecture. The solution can however advantageously be applied also in the above described evolved network architectures (see FIG. 1b and FIG. 1c).

Figure 1B:
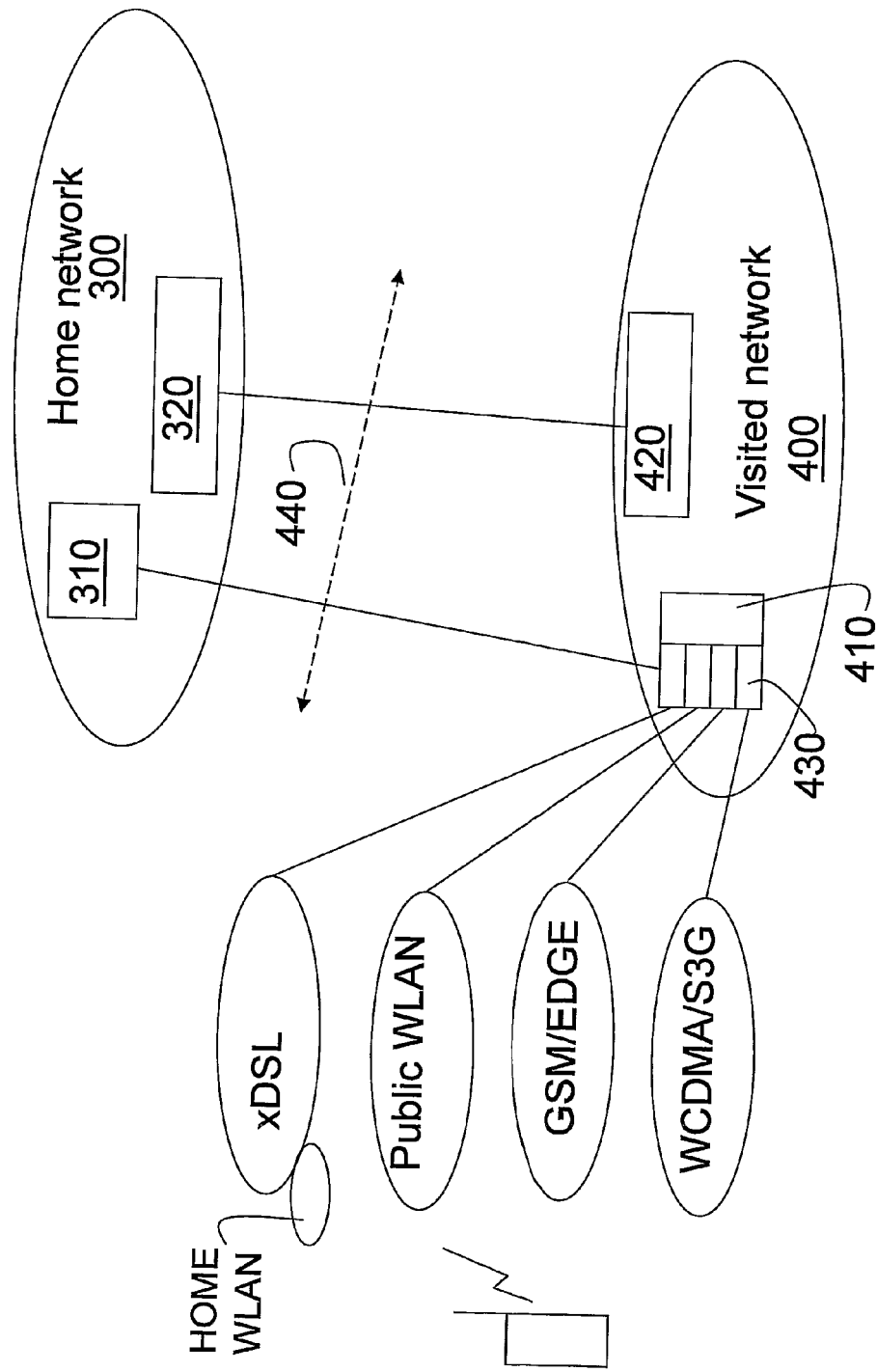
FIG. 1b illustrates one of the long-term target network architectures that has been considered for 3GPP SAE (the one which incorporates AENs), wherein the present invention may be implemented.

Moreover, the solution can be generalized and applied also to I-WLAN in the envisioned evolved 3GPP network architecture as of FIG. 1b (i.e. the architecture including the AENs) as well as possible intermediate stages.

In the evolved network architecture of FIG. 1b PDGh/TTGh and PDGv/TTGv should be replaced by AENH and AENv in the solution. Possibly the UE-AEN tunnel should always end in the AENv, when the UE is roaming in the evolved network architecture, with other mobility mechanisms handling the AENv-AENh part in the home tunneling case.

In possible intermediate evolutionary stages the local breakout tunnel may terminate in the WAG or in the GSN+ in the VPLMN, but otherwise the principles of the solution would be the same.

When applying the solution to the selection of an AEN in the considered evolved network architecture of FIG. 1b, there are two important differences from the selection of a PDG/TTG in the current I-WLAN to keep in mind, both stemming from the anticipated role of the AEN:

The AEN has to be selected before the UE has received an IP address (because the AEN is the entity that is assumed to allocate the IP address).

The AEN has to be selected before the access authentication, i.e. before the HPLMN has been involved in any user authentication procedure (because the AEN is assumed to perform the access authentication, e.g. acting as an EAP Authenticator (in pass-through mode)).

However, despite these differences the basic concept of the solution can be reused, as explained below.

The basic concept of the solution, i.e. including the user identity and preferably the VPLMN ID and/or a service related identifier in an FQDN to be resolved by DNS, may be reused in the context of AEN selection in the long-term evolved network architecture depicted in FIG. 1b.

The UE will probably not receive an IP address before an AEN is selected. Therefore, since DNS requests require an IP address, the UE can probably not issue the DNS request itself. However, the access network could do it on behalf of the UE.

Either the HPLMN or the VPLMN may resolve the DNS request in order to allocate an AEN to the user/UE. This is a design choice. Thus, the DNS request could be sent either to the HPLMN (as in the above described solution for local breakout in I-WLAN) or to the VPLMN.

The FQDN would include data retrieved from the UE. This is the user identity and possibly a service related identifier of some kind (which may or may not be APN based). Since the AEN will probably perform the user authentication at network access and since the AEN naturally cannot be involved before it has been selected, the HPLMN will not be aware of which VPLMN the user is accessing. Therefore, if the DNS request is sent to the HPLMN, the VPLMN ID should also be included in the FQDN. The last part of the FQDN should be a domain name indicating the HPLMN, if the DNS request is to be sent to the HPLMN, or a domain name indicating the VPLMN, if the DNS request is to be sent to the VPLMN.

It is conceivable that the UE could acquire an IP address before the AEN is allocated, e.g. a temporary IP address allocated by the access network. If so, using this IP address the UE could issue the DNS request itself.

Figure 1C:
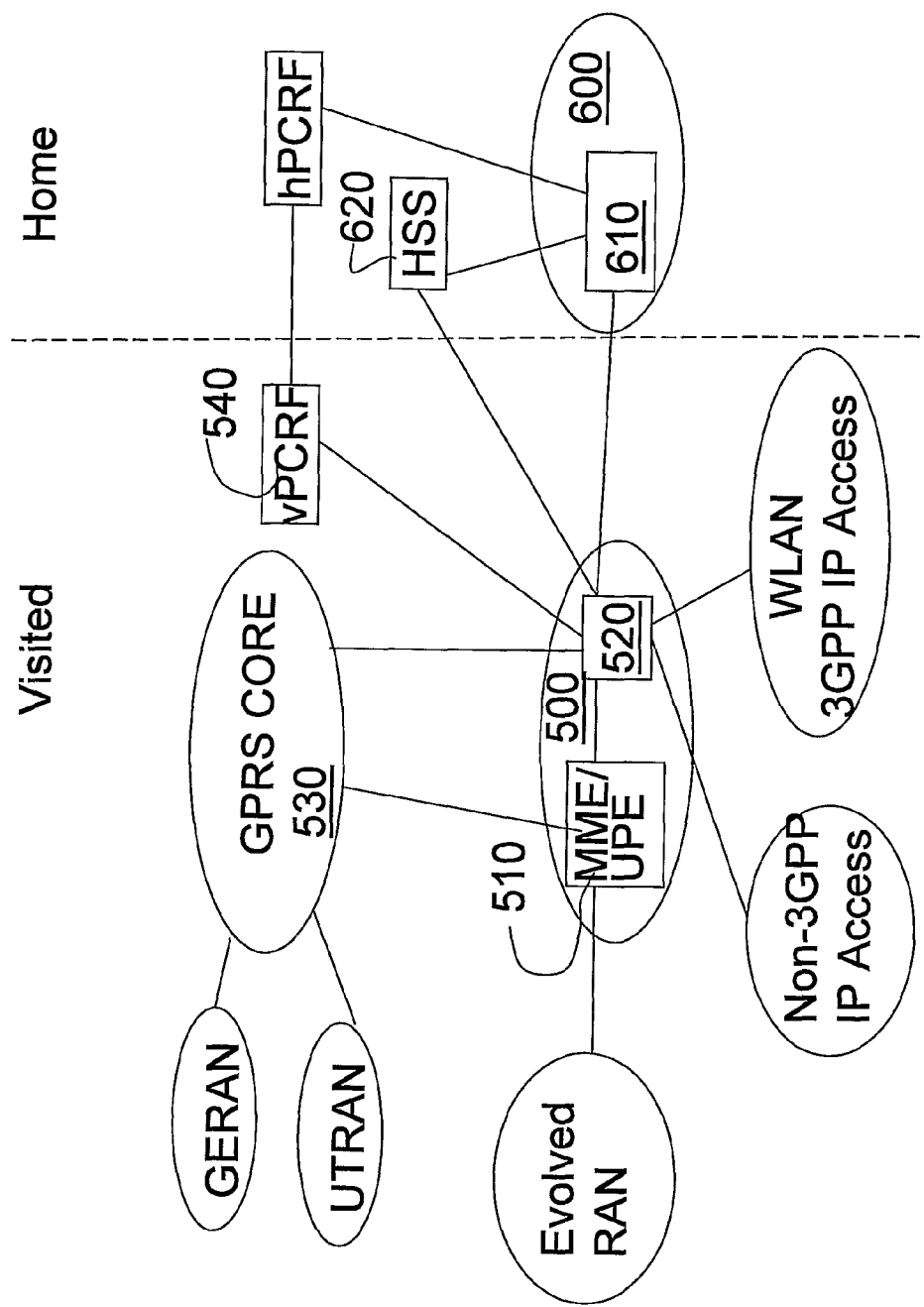
FIG. 1c illustrates one of the long-term target network architectures that has been considered for 3GPP SAE (the one which incorporates IASAs), wherein the present invention may be implemented.

The assumptions for the considered evolved network architecture depicted in FIG. 1c are somewhat different than for the evolved network architecture in FIG. 1b. One such difference is that the non-3GPP (and possibly I-WLAN) access network, in the form of the AGW, is assumed to perform the access authentication, acting as an EAP Authenticator (in passthrough mode). Therefore only one of the differences from the PDG/TTG selection in the current I-WLAN that were listed for AEN selection above applies in this context, namely:

The s-IASA has to be selected before the UE has received an IP address.

Since the s-IASA has to be selected before the UE has received an IP address, the access network, i.e. the AGW, has to send the DNS request on behalf of the UE, i.e. similar to the case of AEN selection. However, in contrast to the case of AEN selection, the AGW does not have to send the DNS request before the access authentication. Thus, when the DNS request is sent, the HPLMN has already been involved in the user authentication and therefore knows which VPLMN, if any, that is concerned.

As in the case of AEN selection the DNS request could be sent either to the VPLMN or to the HPLMN. If the DNS request is sent to the HPLMN, the VPLMN ID may or may not be included in the FQDN, because the option of utilizing the in the HPLMN already available information about the concerned VPLMN (retrieved during the user authentication) is available, just as for PDG/TTG selection in the current I-WLAN. Whether sent to the VPLMN or the HPLMN, the FQDN could include a service related identifier, e.g. the Communication Service Identifier (CSI) or an APN-based identifier.

In any case, the last part of the FQDN should be a domain name indicating the HPLMN, if the DNS request is to be sent to the HPLMN, or a domain name indicating the VPLMN, if the DNS request is to be sent to the VPLMN.

If the solution is used for control of simultaneous local breakout and home tunneling, similar to what is described above, the CSI could be used as an alternative, or addition, to packet filters as a criterion when choosing between local breakout and home tunneling for a certain traffic flow.

A possible variation, although not preferable, is that the AGW could send the DNS request before performing the access authentication, which would make s-IASA selection very similar to AEN selection and would require that the VPLMN ID be included in the FQDN, if the DNS request is sent to the HPLMN.

If a UE potentially can access multiple IASAs from its point of access, then s-IASA selection is applicable also in the non-roaming case, i.e. when no VPLMN is involved. This can be seen as a special case of the above-described procedure for s-IASA selection. In this case neither the VPLMN ID nor local breakout is applicable. The FQDN would contain the user identity and possibly a service related identifier in addition to the domain name indicating the HPLMN.

Note also that in the 3GPP SAE architecture it is still unsettled whether the AAA server is a stand-alone entity or integrated in the HSS. The latter approach is currently the working assumption for the evolved architecture depicted in FIG. 1c.

The present invention can also be applied to the selection/ allocation of Home Agent in the evolved network architecture depicted in FIG. 1c. In the current view of this considered evolved network architecture the HA is allocated directly to the UE using DNS, at least in the case of a non-3GPP (and possibly I-WLAN) access being used. This application of the invention can hence be very similar to the application of the invention as described for PDG/TTG selection in the current I-WLAN. As in the case of PDG/TTG selection a HA could be allocated in either the HPLMN or the VPLMN (with the HPLMN assumedly being the most commonly used option).

A difference from the current I-WLAN (and the current network architecture in general) is that the APN concept will not necessarily be reused in the SAE architecture. It cannot be ruled out, but it is more likely that it is not going to be used. However, an identifier that may serve a similar purpose in the context of this solution is the Communication Service Identifier (CSI).

If the APN concept is reused, then the UE would construct its "regular home FQDN" in the same way as described above. Otherwise the regular home FQDN would consist simply of a domain name belonging to the home PLMN, e.g. <home-operator>.com. The regular home FQDN can then be extended in various ways, similar to what was described above, with a user-ID and a VPLMN ID (e.g. in the shape of a domain name or a combination of a Mobile Country Code (MCC) and a Mobile Network Code (MNC)). The resulting FQDNs are:

<user ID>.<regular home FQDN> or <user ID>.<delimiter string>.<regular home FQDN>
<user ID>.<VPLMN ID>.<regular home FQDN> or <user ID>.<delimiter string>.<VPLMN ID>.<delimiter string>.<regular home FQDN>

In addition, the CSI, or some other service related identifier (henceforth abbreviated SRI), may be included in the FQDN to provide further information to the HPLMN. The CSI or service related identifier could be included in the FQDN e.g. before the regular home FQDN, resulting in the following special FQDNs:

<user ID>.<CSI or SRI>.<regular home FQDN> or <user ID>.<delimiter string>.<CSI or SRI>.<delimiter string>.<regular home FQDN>
<user ID>.<VPLMN ID>.<CSI or SRI>.<regular home FQDN> or <user ID>.<delimiter string>.<VPLMN ID>.<delimiter string>.<CSI or SRI>.<delimiter string>.<regular home FQDN>

If a service related identifier (CSI or SRI) is already a part of the regular home FQDN, then an additional inclusion of this identifier before the regular home FQDN is of course redundant and should not be used.

Extraction of the relevant data from the extended FQDN, the interaction between DNS servers (in the access network, the HPLMN and the VPLMN) and the interaction between the DNS servers and the AAA server and/or policy server are performed in the same way as described above for the present invention's application to PDG/TTG selection in the current I-WLAN (substituting the CSI or SRI for the W-APN and HA for PDG/TTG when applicable).

Most of the possible extensions of the solution that are described in the I-WLAN context are applicable to HA allocation in the considered evolved network architecture of FIG. 1c too, sometimes with minor adaptations.

The simultaneous local breakout and home tunneling extension is applicable. If local breakout is realized through MIPv6 route optimization, then the HPLMN does not have to do anything to enable the feature, but sending packet filters to the UE allows the HPLMN to execute some control over which type of traffic that is allowed for local breakout and home tunneling respectively. The same means for conveying the packet filters to the UE as described above can be used, but with the EAP procedure for the user authentication for WLAN access replaced by the EAP procedure for user authentication in the access network and the EAP procedure during IPsec tunnel establishment replaced by the EAP procedure in conjunction with UE-HA IPsec security association (SA) establishment (which is however performed less frequently). In addition to the examples of packet filter parameters mentioned above, service related parameters, e.g. CSIs or APN-like parameters may be used. Similar packet filters may be conveyed to the VPLMN, so that the VPLMN can enforce the packet filter rules. The AAA infrastructure could be used for this, e.g. during the user authentication procedure in the access network, or an inter-PLMN policy control interface.

The extension described above allowing a user to include a preference indication in the FQDN, indicating whether home tunneling or local breakout is preferred, is applicable, but with the EAP procedure for the user authentication for WLAN access replaced by the EAP procedure for user authentication in the access network and the EAP procedure during IPsec tunnel establishment replaced by the EAP procedure in conjunction with UE-HA IPsec SA establishment (which is however performed less frequently).

The above described variation of using an FQDN without an included user ID is applicable, but with the described use of the W-APN generalized to encompass the possibility of replacing the W-APN with other service related identifiers, such as the CSI (which then should be included in the FQDN).

Although the target mobility protocol for the above described method for HA allocation is Mobile IPv6, the same method can be used for allocation of a Mobile IPv4 HA.

It will be understood by those skilled in the art that various modifications and changes may be made to the present invention without departure from the scope thereof, which is defined by the appended claims.

The invention claimed is:

1. An apparatus in a home Public Land Mobile Network (PLMN) of a user of a User Equipment (UE) for selecting a gateway for connecting the UE to the home PLMN when the UE is located in an access network connected to a visited PLMN, wherein the home PLMN is different from the visited PLMN and the access network, and wherein the apparatus is configured to:
   receive a first Fully Qualified Domain Name (FQDN) from the UE via the access network, wherein the first FQDN contains an identity of the user of the UE;
   determine, based on the received identity of the user and knowledge of the visited PLMN, whether the UE should establish a connection only to a gateway in the home PLMN, only to a gateway in the visited PLMN, or to both a gateway in the home PLMN and a gateway in the visited PLMN; and
   transmit to the UE, an address belonging to a gateway in the visited PLMN if it is determined that the UE should establish a connection only to a gateway in the visited PLMN, or an address belonging to a gateway in the home PLMN if it is determined that the UE should establish a connection only to a gateway in the home PLMN, or addresses belonging to both a gateway in the home PLAN and a gateway in the visited PLMN if it is determined that the UE should establish a connection to both.

2. The apparatus according to claim 1, wherein the apparatus is configured to identify, at least based on the user identity, one or more valid policies which govern the outcome of gateway selection.

3. The apparatus according to claim 1, wherein the home PLMN gains knowledge of the identity of the visited PLMN during an authentication procedure.

4. The apparatus according to claim 1, wherein the first FQDN includes an identity of the visited PLMN.

5. The apparatus according to claim 1, wherein the gateway for connecting the UE, to the home PLMN is a Packet Data Gateway/Tunnel Terminating Gateway (PDG/TTG).

6. The apparatus according to claim 1, wherein the apparatus is configured to consult an authentication device or a policy server in the home PLMN to determine whether connection to a gateway in the visited PLMN, connection to gateway in the home PLMN, or connection to both should be selected.

7. The apparatus according to claim 1, wherein if it is determined that the UE should establish a connection to a gateway in the visited PLMN, the apparatus is further configured to:
   construct a second FQDN that indicates the visited PLMN;
   send the second FQDN to the visited PLMN;
   receive the address belonging to the gateway in the visited PLMN based on the sent second FQDN; and
   transmit the address belonging to the gateway in the visited PLMN to the UE.

8. The apparatus according to claim 7, wherein the apparatus is configured to construct the second FQDN by modifying the first FQDN, and wherein the apparatus is configured to modify the first FQDN by:
   removing the user identity from the first FQDN;
   removing the identity of the visited PLMN from the first FQDN if the first FQDN comprises an identity of the visited PLMN; and
   replacing an indication of the home PLMN in the first FQDN with an indication of the visited PLMN.

9. The apparatus according to claim 1, wherein the FQDN includes an indication of user preference concerning connection to a gateway in the visited PLMN versus connection to a gateway in the home PLMN.

10. The apparatus according to claim 2, wherein the valid policies are identified by means of a WLAN-Access Point Name (W-APN) included in the FQDN.

11. The apparatus according to claim 1, wherein the apparatus is configured to transmit the gateway address or addresses in a Domain Name System (DNS) response.

12. The apparatus according to claim 11, wherein the apparatus is configured to set a Time To Live (TTL) parameter in the DNS response to zero.

13. An apparatus in a home Public Land Mobile Network (PLMN) of a user of a User Equipment (UE) for selecting a gateway through which to connect the UE to the home PLMN when the UE is located in an access network connected to a visited MAN, wherein the home PLMN is different from the visited PLMN and the access network, and wherein the apparatus is configured to:
   receive a first Fully Qualified Domain Name (FQDN) wherein the first FQDN contains an identity of the user of the UE;
   determine, based on the received identity of the user and knowledge of the visited PLMN, that the UE should establish a connection only to a gateway in the visited PLMN; and
   transmit, by a home PLMN Domain Name System (DNS) server, a Canonical Name (CNAME) resource record comprising a second FQDN to be used instead of the first received FQDN and to be sent to a visited PLMN DNS server, wherein the second FQDN is constructed utilizing a WLAN-Access Point Name (W-APN) network identifier and the identity of the visited PLMN, such that the visited PLMN DNS server can send a gateway address to the UE by resolving the second FQDN.

14. A method in a home Public Land Mobile Network (PLMN) of a user of a User Equipment (UE) for selecting a gateway for connecting the UE to the home PLMN when the UE is located in an access network connected to a visited PLMN, wherein the home PLMN is different from the visited PLMN and the access network, the method comprising the steps of:
   receiving a first Fully Qualified Domain Name (FQDN) from the UE via the access network, wherein the first FQDN contains an identity of the user of the UE;
   determining, based on the received identity of the user and knowledge of the visited PLMN, whether the UE should establish a connection only to a gateway in the home PLMN, only to a gateway in the visited PLMN, or to both a gateway in the home PLMN and a gateway in the visited PLMN; and
   transmitting to the UE, an address belonging to a gateway in the visited PLMN if it is determined that the UE should establish a connection only to a gateway in the visited PLMN, or an address belonging to a gateway in the home PLMN if it is determined that the UE should establish a connection only to a gateway in the home PLMN, or addresses belonging to both a gateway in the home PLMN and a gateway in the visited PLMN it is determined that the UE should establish a connection to both.

15. The method according to claim 14, wherein the step of receiving the first FQDN includes receiving in the first FQDN, an identity of the visited PLMN to make the home PLMN aware of the identity of the visited PLMN.

16. The method according to clam 14, wherein the determining step includes consulting an authentication device or a policy server in the home PLMN to determine whether connection to a gateway in the visited PLMN, connection to a gateway in the home PLMN, or connection to both should be selected.

17. The method according to claim 14, wherein if it is determined that the UE should establish a connection to a gateway in the visited PLMN, the determining step comprises the further steps of:
   constructing a second FQDN that indicates the visited PLMN;
   sending the second FQDN to the visited PLMN;
   receiving the address belonging to the gateway in the visited PLMN at least base on the sent second FQDN; and
   transmitting the address belonging to the gat in the visited PLMN to the UE.

18. The method according to claim 17, wherein the step of constructing a second FQDN includes modifying the first FQDN by:
   removing the user identity from the first FQDN,
   removing the identity of the visited PLMN from the first FQDN, if the first FQDN comprises an identity of the visited PLMN, and
   replacing an indication of the home PLMN in the first FODN with an indication of the visited PLMN.

* * * * *

UNITED STATES PATENT AND TRADEMARK OFFICE
CERTIFICATE OF CORRECTION

PATENT NO.         : 8,406,170 B2
APPLICATION NO.    : 12/514325
DATED              : March 26, 2013
INVENTOR(S)        : Rune It is certified that error appears in the above-identified patent and that said Letters Patent is hereby corrected as shown below:

On the Title Page, in Item (56), under "OTHER PUBLICATIONS", in Column 2, Line 1, delete "3GPP." and insert -- 3GPP, --, therefor.

On the Title Page, in Item (56), under "OTHER PUBLICATIONS", in Column 2, Line 4, delete "7). 3GPP TS 23.234 v7.3.0. Sep." and insert -- 7), 3GPP TS 23.234, v7.3.0, Sep. --, therefor.

In the Specification:

In Column 1, Line 25, delete "$3^{rd}$" and insert -- "$3^{rd}$ --, therefor.

In Column 1, Line 29, delete "(Release 6)." and insert -- "(Release 6)". --, therefor.

In Column 2, Line 27, delete """ Extensible" and insert -- "Extensible --, therefor.

In Column 2, Line 41, delete "Rt." and insert -- R. --, therefor.

In Column 3, Line 53, delete "PDG/TG" and insert -- PDG/TTG --, therefor.

In Column 4, Line 5, delete "(SS)." and insert -- (HSS). --, therefor.

In Column 4, Line 31, delete "signaling)." and insert -- signalling). --, therefor.

In Column 4, Line 60, delete "addresses)" and insert -- address(es) --, therefor at each occurrence throughout the specification.

In Column 5, Line 18, delete "$3^{rd}$" and insert -- "$3^{rd}$ --, therefor.

In Column 5, Line 22, delete "(Release 6)"."" and insert -- (Release 6)". --, therefor.

Signed and Sealed this
Ninth Day of July, 2013

Teresa Stanek Rea
*Acting Director of the United States Patent and Trademark Office*

CERTIFICATE OF CORRECTION (continued)

U.S. Pat. No. 8,406,170 B2

In Column 5, Line 47, delete "Giaretta" and insert -- Giaretta, --, therefor.

In Column 5, Line 48, delete "internet-Draft:" and insert -- Internet-Draft: --, therefor.

In Column 5, Line 66, delete ""$_{mip}$6." and insert -- "_mip6. --, therefor.

Figure 8B:
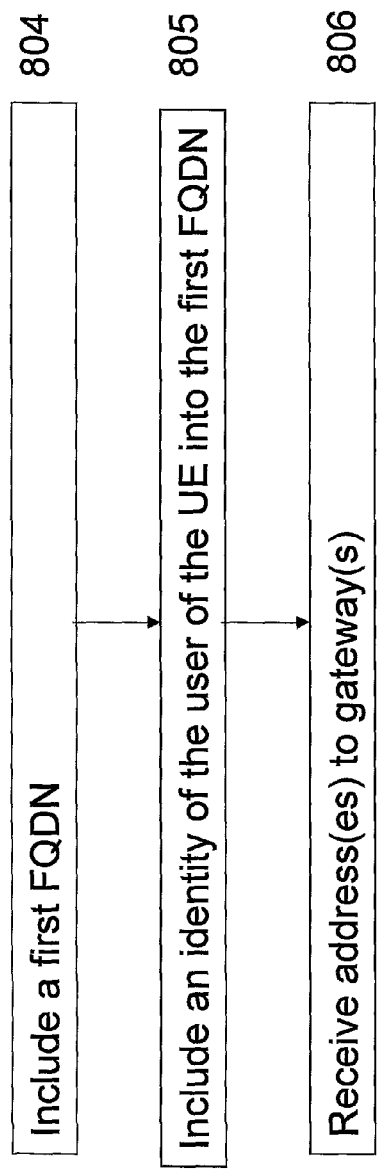

In Column 9, Line 18, delete "FIGS. 5a and 5b" and insert -- FIGS. 8a and 8b --, therefor.

In Column 10, Line 21, delete "PDG/TG" and insert -- PDG/TTG --, therefor.

In Column 11, Line 30, delete "FIG. 5b" and insert -- FIG. 8b --, therefor.

In Column 12, Line 21, delete "signaling" and insert -- signalling --, therefor.

In Column 13, Line 64, delete "malting" and insert -- making --, therefor.

In Column 14, Line 16, delete "server)" and insert -- server). --, therefor.

In Column 14, Line 52, delete "US" and insert -- UE --, therefor.

In Column 15, Line 3, delete "Ape" and insert -- Type --, therefor.

In Column 15, Line 10, delete "(Release 6))," and insert -- (Release 6))", --, therefor.

In Column 15, Line 60, delete "piggybacked" and insert -- piggy-backed --, therefor.

In Column 16, Line 63, delete "UE-PDG/TG" and insert -- UE-PDG/TTG --, therefor.

In Column 17, Line 47, delete "Tine" and insert -- Time --, therefor.

In Column 19, Line 27, delete "verity" and insert -- verify --, therefor.

In Column 20, Line 15, delete "AENH" and insert -- AENh --, therefor.

In the Claims:

In Column 23, Line 65, in Claim 1, delete "PLAN" and insert -- PLMN --, therefor.

In Column 24, Line 11, in Claim 5, delete "UE," and insert -- UE --, therefor.

In Column 24, Line 17, in Claim 6, delete "gateway" and insert -- a gateway --, therefor.

In Column 24, Line 26, in Claim 7, delete "PLMN" and insert -- PLMN at least --, therefor.

CERTIFICATE OF CORRECTION (continued)
U.S. Pat. No. 8,406,170 B2

In Column 24, Line 56, in Claim 13, delete "MAN," and insert -- PLMN, --, therefor.

In Column 26, Line 5, in Claim 16, delete "clam" and insert -- claim --, therefor.

In Column 26, Line 19, in Claim 17, delete "base" and insert -- based --, therefor.

In Column 26, Line 20, in Claim 17, delete "gat" and insert -- gateway --, therefor.

In Column 26, Line 30, in Claim 18, delete "FODN" and insert -- FQDN --, therefor.